США006195513B1

(12) United States Patent
Nihei et al.

(10) Patent No.: US 6,195,513 B1
(45) Date of Patent: Feb. 27, 2001

(54) ELECTRONIC CAMERA ACCESSORY AND IMAGE COMPOSITION SYSTEM

(75) Inventors: Kaname Nihei; Hiroshi Igarashi; Kazuki Iwabe; Masahiro Konishi, all of Asaki (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/024,987

(22) Filed: Feb. 17, 1998

(30) Foreign Application Priority Data

Feb. 17, 1997 (JP) .................................................... 9-031949
Mar. 24, 1997 (JP) .................................................... 9-070000
Jun. 17, 1997 (JP) .................................................... 9-160228

(51) Int. Cl.[7] .......................... G03B 41/00; G03B 17/48
(52) U.S. Cl. .......................... 396/332; 396/335; 396/429
(58) Field of Search .................................... 396/322, 332, 396/335, 429, 544, 337; 348/375, 598; 355/4 D

(56) References Cited

U.S. PATENT DOCUMENTS

| 4,937,676 | * | 6/1990 | Finelli et al. ......................... | 348/375 |
| 4,949,279 | * | 8/1990 | Takakura et al. ..................... | 364/518 |
| 5,187,512 | * | 2/1993 | Kirkendall ............................ | 396/340 |
| 5,345,313 | * | 9/1994 | Blank .................................... | 348/598 |
| 5,396,594 | * | 3/1995 | Griffith et al. ........................ | 395/164 |
| 5,758,216 | * | 5/1998 | Arnold .................................. | 396/311 |
| 5,790,193 | * | 8/1998 | Ohmori ................................ | 348/375 |

FOREIGN PATENT DOCUMENTS 5308508    11/1993   (JP) .
06332122   12/1994   (JP) .

* cited by examiner

Primary Examiner—D. Rutledge

(57) ABSTRACT

An accessory unit is mounted on an electronic camera, and a printer connects to the electronic camera via a SCSI terminal of the accessory unit. An image signal is captured from a CCD in response to the releasing operation, and the image signal is analog-to-digital converted before being transferred to the accessory unit. The accessory unit converts the image signal into RGB data suitable for the printer, and outputs the RGB data to the printer so that the captured image can be simultaneously with the image-capturing. Moreover, during sequential image-capturing, captured image data is sequentially stored in an uncompressed state in a frame memory of the accessory unit. After sequential image-capturing is completed, the image data is transferred to the camera in an order in which it is stored, and compressed. Further, a background image is recorded in a memory card in advance, and an image is composed from the background image and a captured image (or a reproduced image) in the accessory unit. The composite image data is then transferred to the printer.

56 Claims, 18 Drawing Sheets

F I G. 1
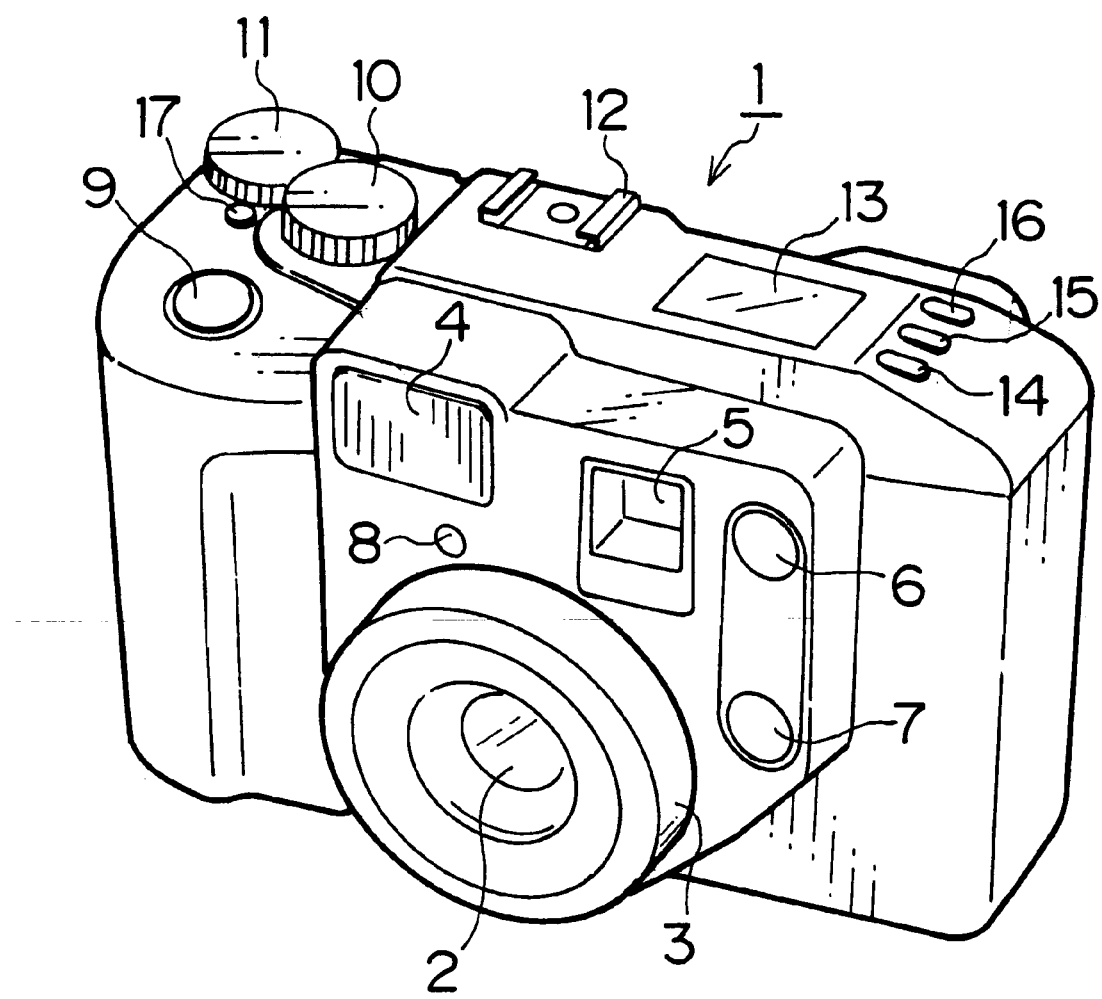

F I G. 2
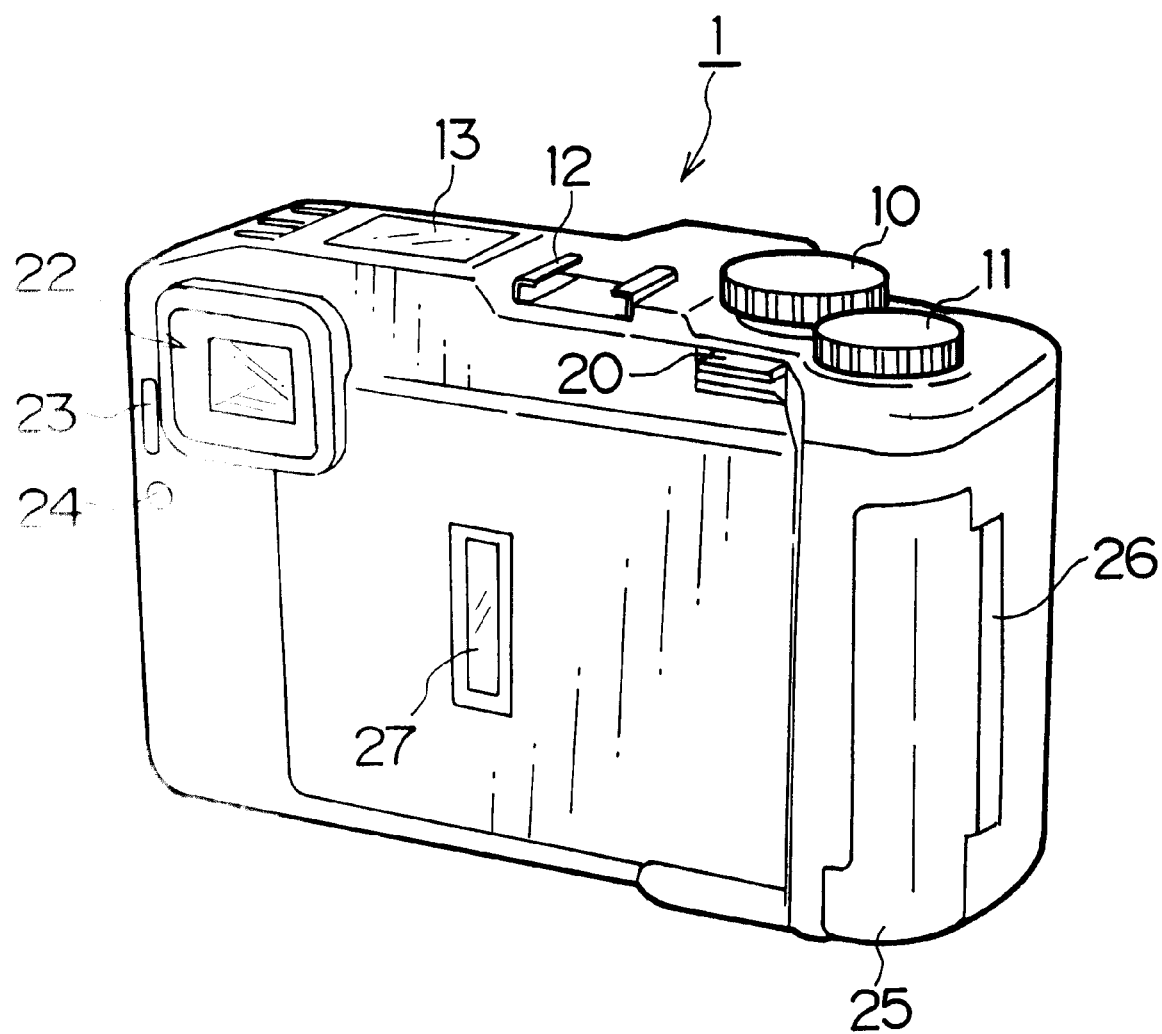

F I G. 9
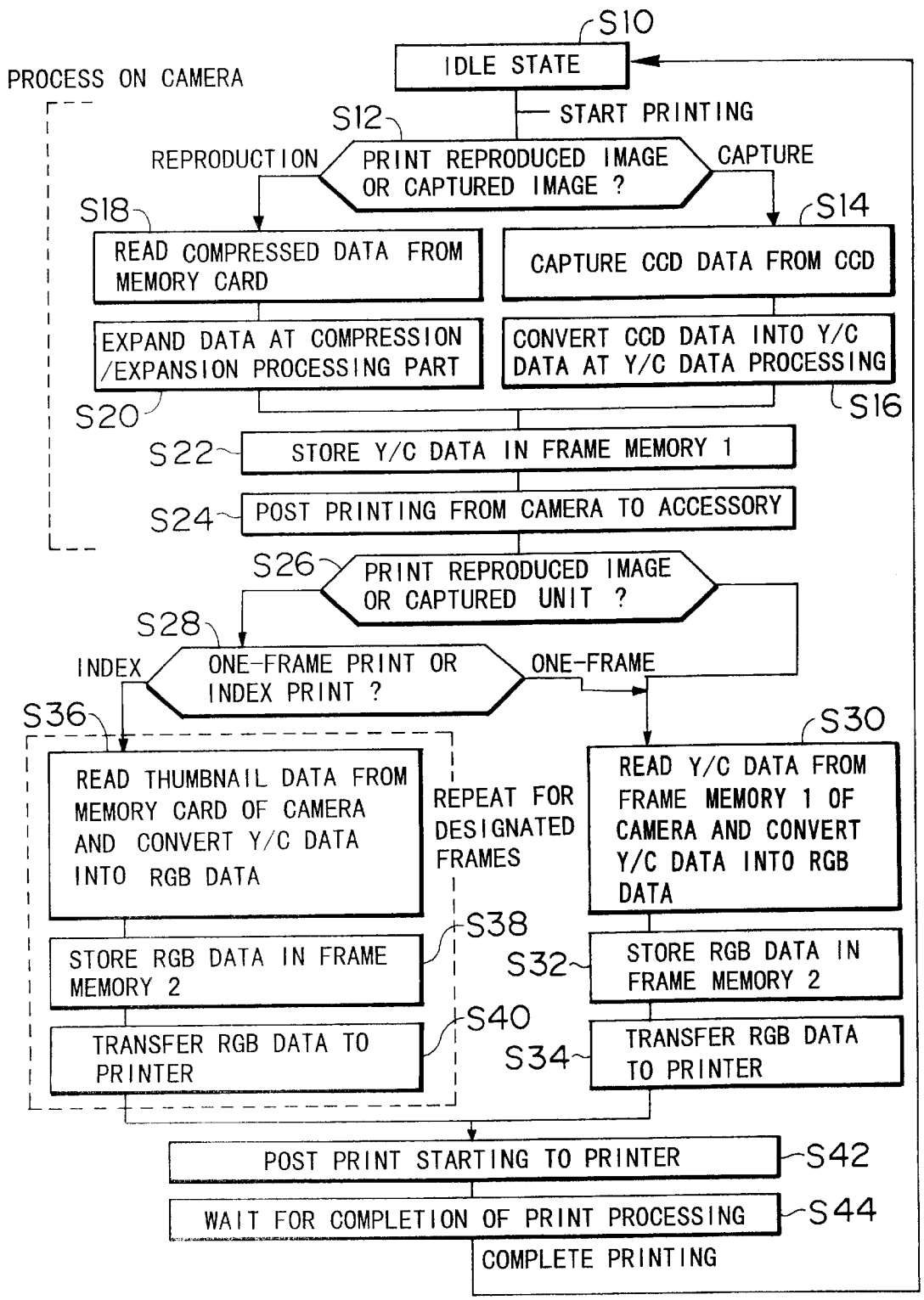

F I G. 1 0 (a)
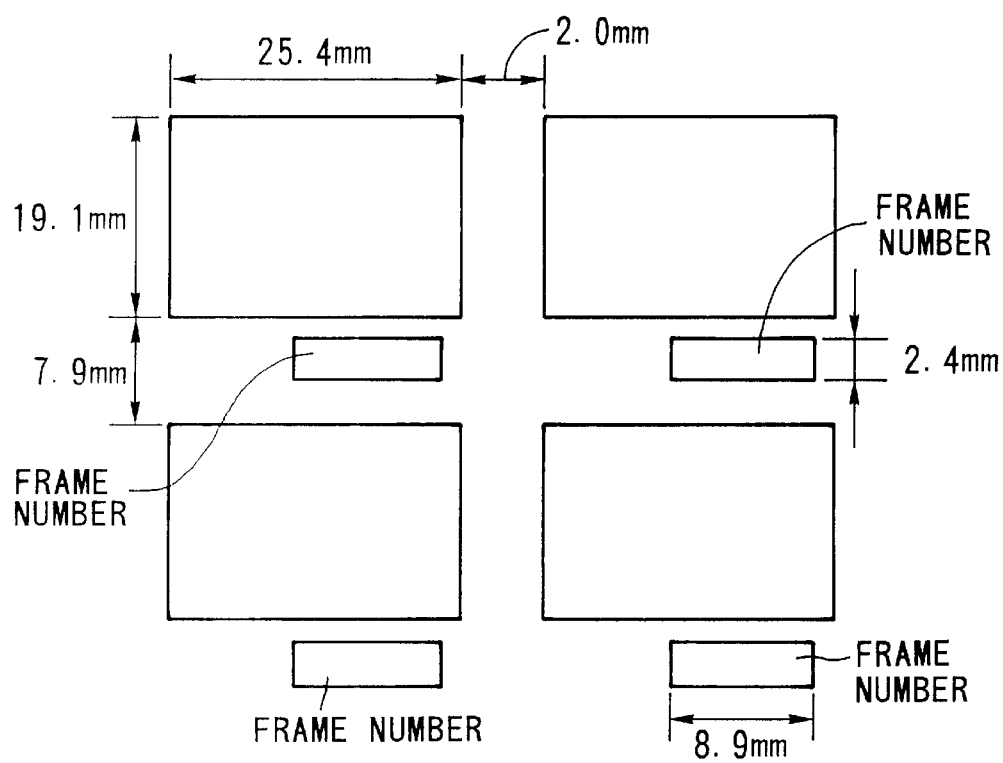
F I G. 1 0 (b)
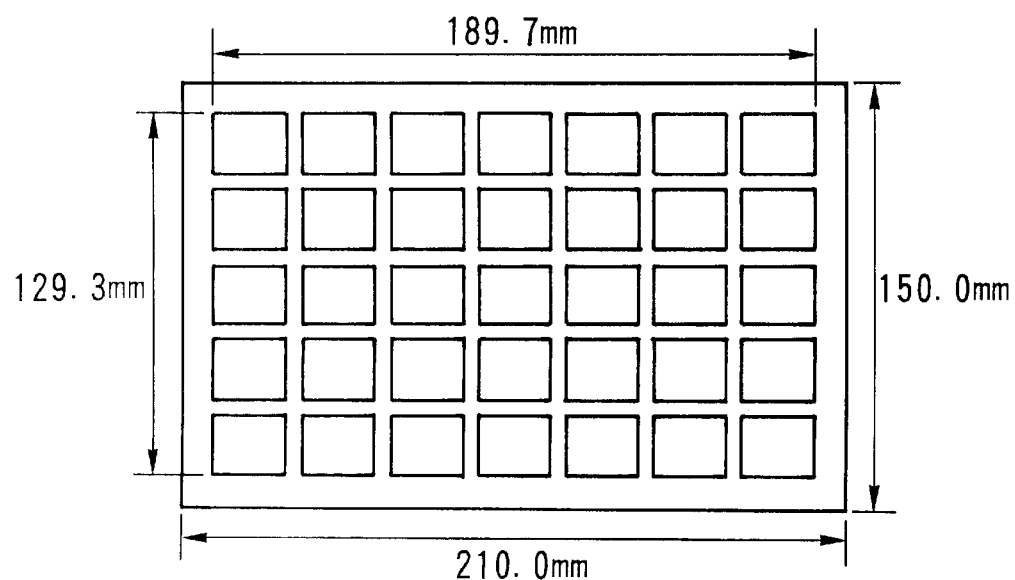

F I G. 1 1
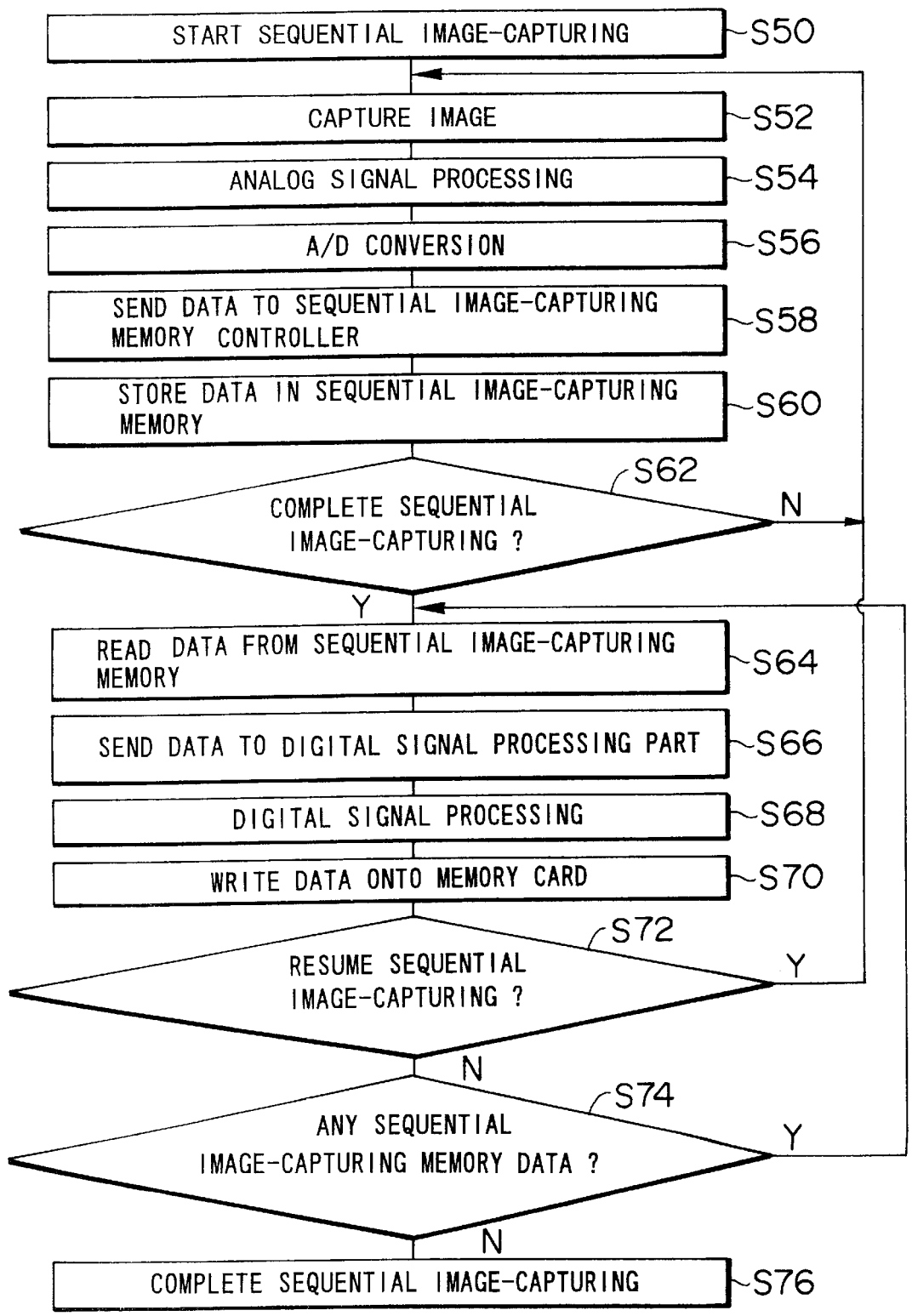

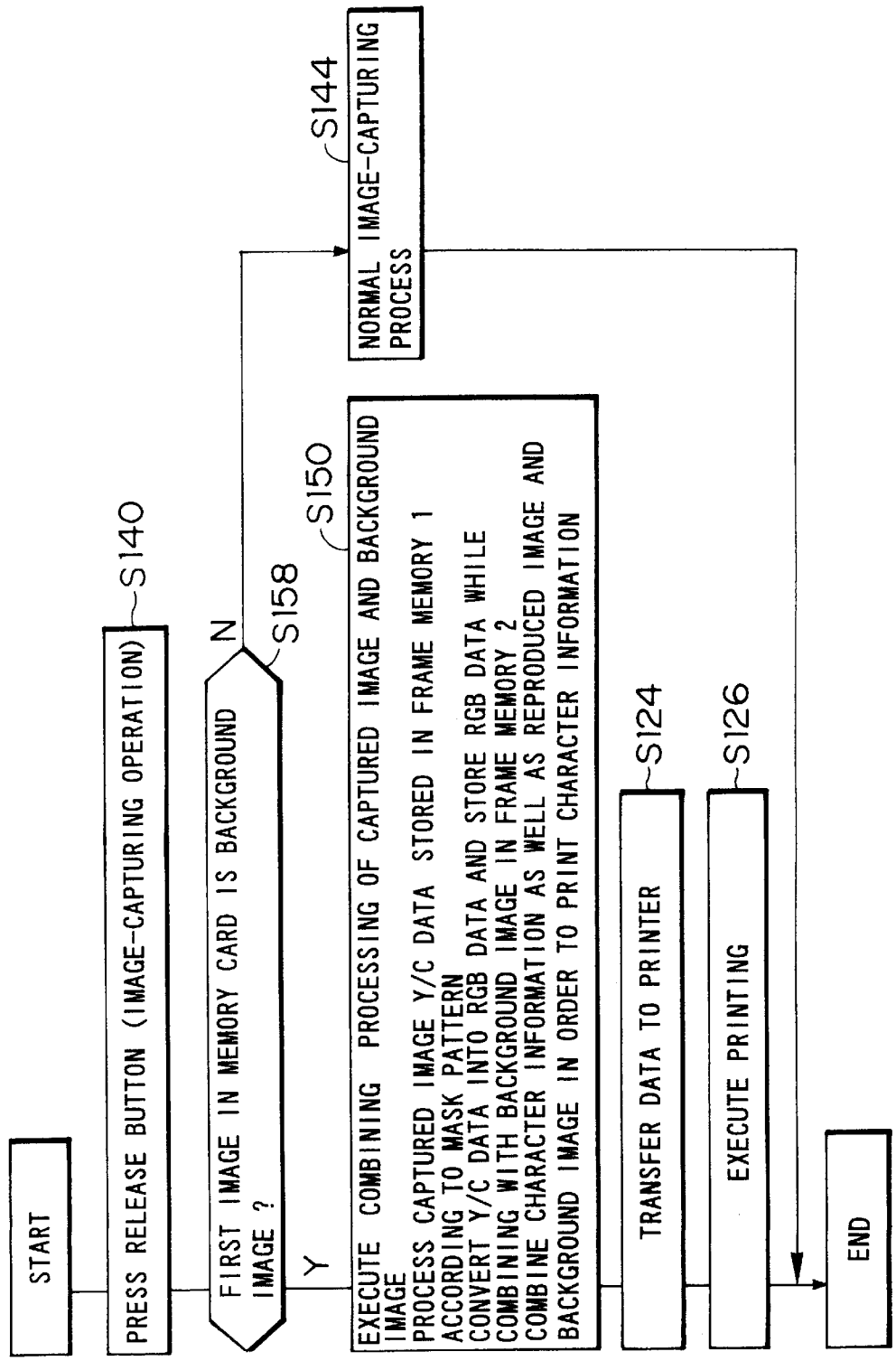

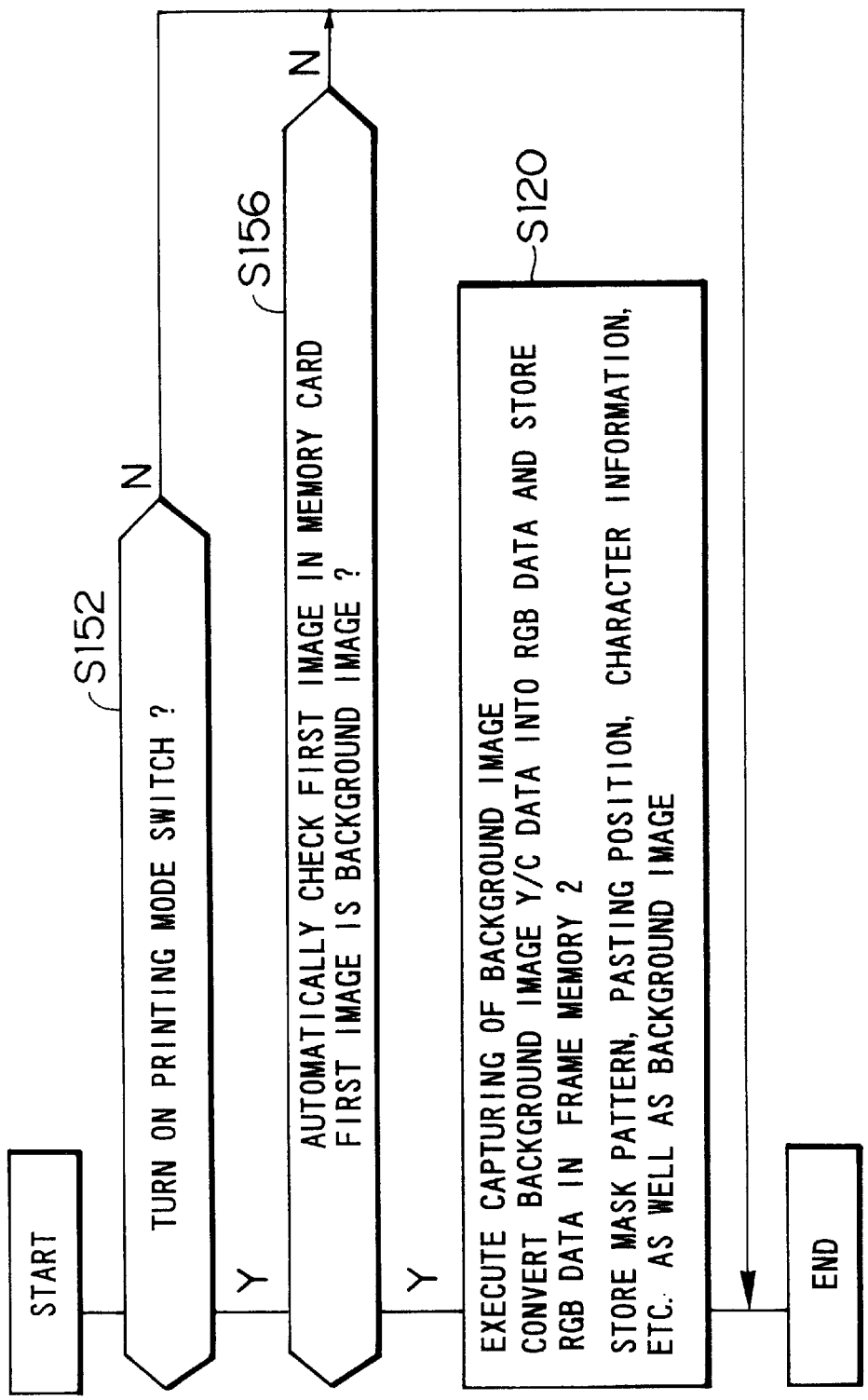

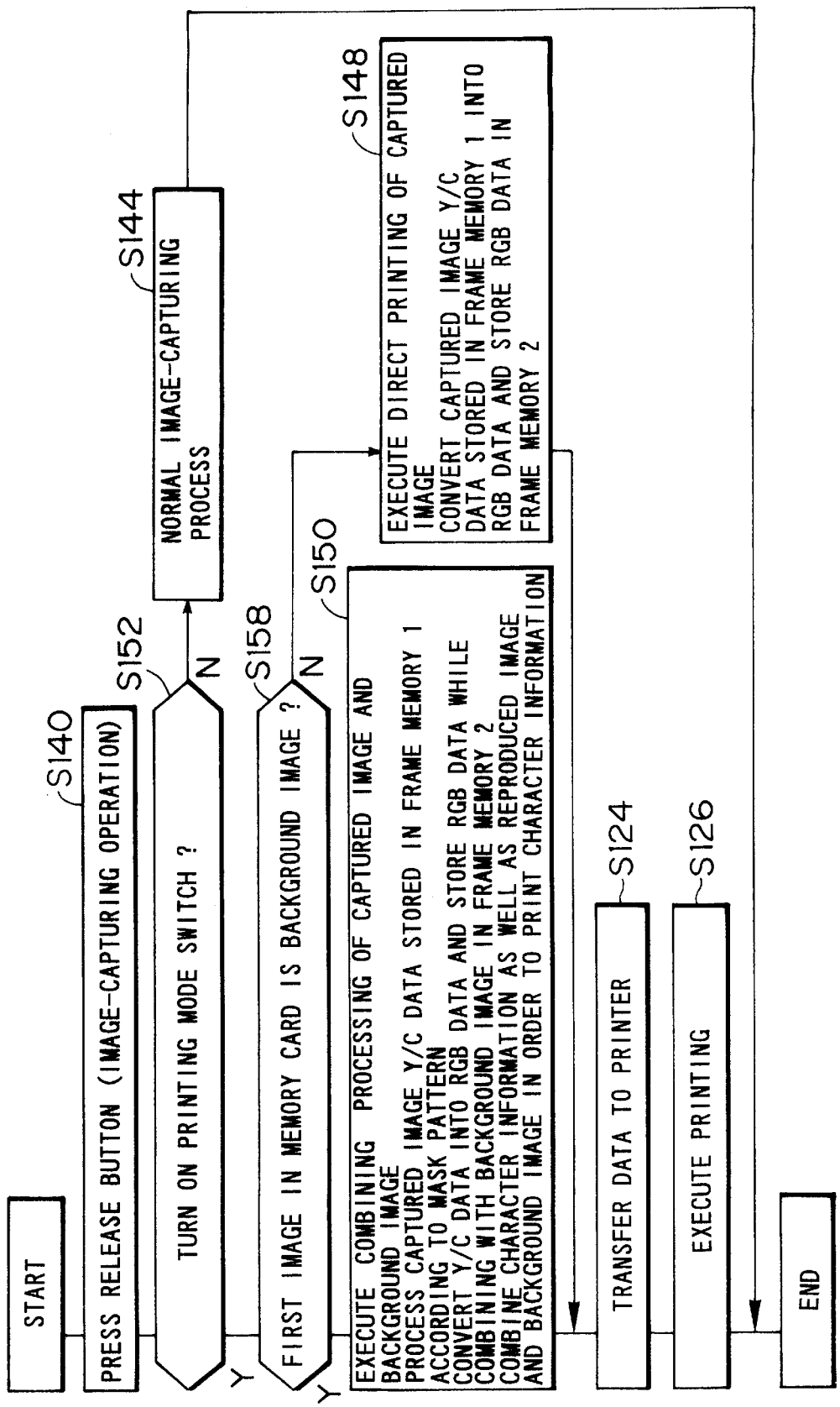

ELECTRONIC CAMERA ACCESSORY AND IMAGE COMPOSITION SYSTEM

BACKGROUND OF THE INVENTION

1. Field of the Invention

The present invention relates generally to an electronic camera accessory which is attached to an electronic camera, and more particularly to an electronic camera accessory which enables the electronic camera to sequentially capture images and enables the electronic camera to directly connect to a printer so that the image captured by the electronic camera can be printed on the printer.

The present invention also relates generally to an image composition system, and more particularly to an image composition system for composing an image from a background image and a captured image and outputting the composite image to the printer, etc., and an electronic camera with an image composing function and a recording medium suitable for the electronic camera.

2. Description of Related Art

In a conventional electronic camera, captured image data is compressed in such a format as JPEG (Joint Photographic Experts Group) in order to record and retain an increasing amount of data within a limited recording capacity, and the compressed image data is stored in a built-in memory of the camera or a memory card which can be freely inserted and pulled out. The electronic camera connects to a TV set, or the image data recorded in the memory card is transferred to a personal computer, so that the captured image is displayed on a screen of the personal computer or the TV. The image is printed on a printer connected to the personal computer.

In the conventional electronic camera, however, the personal computer is indispensable and is operated in a complicated manner, since the image is printed on a printer which connects to the camera via the personal computer. The image data stored in the built-in memory, etc. is compressed. For this reason, in order to print the captured image, the compressed image data is read from the built-in memory, etc. and is expanded, and then the image data is transferred to the printer. Thus, it takes a lot time to print an image.

On the other hand, if a special function such as direct printing without the use of the personal computer is provided in the camera, the camera body would be expensive.

Moreover, in the conventional electronic camera, the captured image data is recorded in the memory card, etc. after compression processing, and thus, it takes a lot time to process the data and the sequential image-capturing becomes impossible. The sequential image-capturing is also a special image-capturing mode, and thus, if a large capacity of buffer memory is provided in the camera to enable the sequential image-capturing, the camera body would be expensive.

Japanese Patent Provisional Publication No. 6-332122 discloses a system for making a composite image. According to this system, image data is sent to a personal computer from an electronic camera or a scanner, etc., and the personal computer executes edit processing such as image composition. Then, a composite image is printed on a printer which connects to the personal computer. This image composition system is large in size. Both the personal computer and the printer must be set with a variety of parameters to execute the edit processing. The personal computer is indispensable in the system, and the personal computer must be operated in a complicated manner.

On the other hand, Japanese Patent Provisional Publication No. 5-308503 discloses another image composition system which does not use the personal computer. According to this system, a previously-provided background pattern is pasted on a background of an object image, and then a composite image is printed. In this system, the background of the object image is composed with the previously-provided background pattern, and thus, the object image must be distinguishable from the background.

Furthermore, there is no conventional electronic camera with the normal image-capturing function which camera is provided with the image composing function of combining the background image and the captured image in the electronic camera or in an accessory unit which is detachably connected to the electronic camera body.

SUMMARY OF THE INVENTION

The present invention has been developed in view of the above-described circumstances, and has as its object the provision of an electronic camera accessory which is able to be attached to the electronic camera as the need arises, so that functions such as direct printing and sequential image-capturing can be performed.

It is another object of the present invention to provide an image composition system and an electronic camera with an image composing function, which are provided with the normal image-capturing function and the image composing function of combining the captured or reproduced image and the previously-provided background image and are able to print the image.

It is yet another object of the present invention to provide an electronic camera with the image composing function, which is able to automatically switch between the normal image-capturing function and the image-composing function, in accordance with an identifier provided on a recording medium such as a memory card mounted in the electronic camera or with identification information recorded in the recording medium.

It is yet another object of the present invention to provide an electronic camera with the image-composing function, which has both the normal image-capturing function and the image-composing function, and a recording medium suitable for the electronic camera. The background image is provided by the recording medium such as the memory card mounted in the electronic camera, and the composite image is recorded in the recording medium.

To achieve the above-mentioned objects, an electronic camera accessory of the present invention which detachably connects, via an interface, to an electronic camera which stores a captured still image in a form of digital data into a memory. The electronic camera accessory comprises: a terminal which enables the accessory to connect to a printer; and a communication controller which performs two-way communication with the printer connected to the terminal, and transfers image data, via the interface, to the printer in a data format suitable for the printer.

According to the present invention, the accessory is provided with the terminal for connecting to the printer, and the printer is directly connected to the accessory via the terminal. The two-way communication is performed between the accessory and the printer, and the communication controller of the accessory directly controls the printer to print the image data. Thus, the personal computer is not required for printing, and the printing can be easily performed. The time required for transferring the image data can be reduced, and the image data can be printed within a short period of time.

According to another mode of the present invention, the electronic camera accessory is provided with a plurality of color correction lookup tables (LUT) which are suitable for a plurality of printers able to connect to the terminal. The type of the currently-connected printer is automatically recognized in accordance with a signal which is output from the printer during the two-way communication. The suitable color correction LUT is selected according to the recognized type. Thus, the color of the image to be printed on the printer can automatically be adjusted according to the type of the connected printer.

Moreover, according to another mode of the present invention, the image data is captured and transferred to the accessory via the interface in response to the pressing operation of the release button which instructs the camera to start image-capturing. Then, the image data is processed to be in a data format suitable for the printer by the communication controller, and is transferred to the printer. Thus, the captured image can be printed at the same time as the image-capturing. The image data of the still image, which is captured in response to the operation of the release button, is transferred in an uncompressed state to the accessory. Thereby, the processing time can be reduced.

To achieve the above-mentioned object, there is an electronic camera accessory of the present invention which detachably connects, via an interface, to an electronic camera. The camera comprises a signal processor which converts a still image captured by an image-capturer into digital data, a data compressor which compresses image data output from the signal processor in a predetermined format, and a memory which stores the compressed image data compressed by the data compressor. The electronic camera accessory enables a sequential image-capturing mode to be set to sequentially capture images at predetermined intervals, in accordance with pressing operation of a release button of the electronic camera, when the electronic camera accessory is mounted on the electronic camera. The electronic camera accessory comprises: storage which stores uncompressed image data which is output from the signal processor during sequential image-capturing in the sequential image-capturing mode and is transferred via the interface without compressing the data; and a controller which sequentially stores, in the storage, image data of a plurality of frames which are sequentially captured during the sequential image-capturing in the sequential image-capturing mode, and reads, after the sequential image-capturing is completed, the image data of each frame from the storage in an order in which the frames are stored to transfer the read image data to the data compressor via the interface.

According to the present invention, the accessory is mounted on the electronic camera so that the sequential image-capturing mode can be set. If the release button is pressed in the sequential image-capturing mode, the electronic camera sequentially picks up images at predetermined intervals and the image data of each frame is sequentially captured. In this case, the image data, which is sequentially captured during the sequential image-capturing, is sequentially stored in the uncompressed state in the storage. After the sequential image-capturing is completed, the image data is read on a frame-by-frame basis in an order in which the frames are stored, and the image data is transferred to the camera. Then, the image data is recorded in the memory after predetermined signal processing such as the compression processing. Thus, the sequential image-capturing can be performed without any restrictions from the time needed for signal processing (recording action).

Such a special function in the sequential image-capturing is provided as the accessory of the electronic camera, so that the camera body can be compact and inexpensive.

Furthermore, according to another mode of the present invention, if the release button is pressed to perform a new sequential image-capturing before the completion of the reading of image data stored in the storage, the reading of the image data stored in the storage is suspended, and the storing of the sequentially-captured image data is resumed within the available storage capacity of the storage. Hence, even if the recording action of all sequentially-captured images which are captured during the previous sequential image-capturing is not completed, the sequential image-capturing can immediately continue if there is available storage capacity, since the data has not been stored yet or the data has already been processed.

According to the related art, the storage is mapped over X-Y coordinates space, and the image data is two-dimensionally controlled in the memory space. According to another mode of the present invention, however, the image data, which is sequentially captured during the sequential image-capturing, is handled as sequential data in memory space in the storage, and is linearly written in the storage. Thus, the memory area can be used more efficiently than before.

Furthermore, to achieve the above-mentioned objects, an electronic camera of the present invention with an image-composing function comprises: an electronic camera which picks up a subject image shown on a finder and obtains image data representing the picked-up image; a background image provider which provides image data representing a background image; and an image composing unit which detachably connects to the electronic camera. The image includes unit comprising a terminal connecting to the electronic camera, a terminal capable of connecting to a printer, a combining processor which combines the image data representing the background image, provided by the background image provider, and the image data representing the picked-up image which is obtained during image-picking by means of the electronic camera, and a communication controller which performs two-way communication with the printer and transfers the combined image data representing a composite image, combined by the combining processor, to the printer in a format suitable for the printer.

According to the present invention, the image composing unit, which is additionally attached to the electronic camera, combines the image data representing the background image provided by the background image provider and the image data representing the captured image, which is captured in the image-capturing performed by the electronic camera, and thereby produces a composite image. The image data representing the composite image is transferred to a printer connected to the image composing unit, so that the composite image can be printed. The desired image can be read from the recording medium in which the captured image and other images, which are captured in advance for example, are recorded, and the read image is displayed on the display as the reproduced image. Then, the composite image can be composed from the reproduced image and the background image. The steps of combining processing and printing image outputting are performed in response to manipulation of the release button or a key which gives a printing instruction. Thus, the composite image can be printed easily.

According to another mode, an electronic camera of the present invention with an image-composing function comprises: an image capturer which picks up a subject image shown on a finder and obtains image data representing the picked-up image, a recording medium which is detachably connected to a camera body; a detector which detects whether image data representing a background image is recorded or not in the recording medium; a combining processor which combines the image data representing the picked-up image, captured by the image capturer, and the image data representing the background image, recorded in the recording medium, if the detector detects that the image data representing the background image is recorded in the recording medium; and an output unit which outputs the combined image data representing a composite image, combined by the combining processor, if the detector detects that the image data representing the background image is recorded in the recording medium, and outputs the image data representing the picked-up image, captured by the image capturer, if the detector does not detect that the image data representing the background image is recorded in the recording medium.

Thus, the functions can be switched between the normal image-capturing function and the image-composing function in accordance with the classification of the recording medium mounted in the electronic camera or the information recorded in the recording medium.

According to another mode, an electronic camera of the present invention with an image-composing function comprises: an image capturer which picks up a subject image shown on a finder and obtains image data representing the picked-up image; a recording medium which is attached to and detached from a camera body, image data representing a background image being recorded in a part of the recording medium; a combining processor which combines the image data representing the picked-up image, captured by the image capturer, and the image data representing the background image, recorded in the recording medium; and a recorder which records the combined image data representing a composite image, combined by the combining processor, in one of an area of the recording medium except for the area where the image data representing the background image is recorded and another recording medium mounted on the camera body.

Thus, the recording medium, which can be attached to and removed from the camera body, provides the image data representing the background image, and the image data representing the composite image can be recorded in the recording medium.

The recording medium of the present invention contains information about the origin and size of a pasting area in the background image as well as the image data representing the background image, and the combining processor pastes the captured or reproduced image on the background image while controlling the position and expansion/compression of the picked-up or reproduced image in accordance with the information during the image composition. Thus, the user can freely capture images without paying any attention to the mask pattern, etc. of the background image, and the satisfactory composite image can be obtained.

Furthermore, the mask pattern indicating the pasting area in the background image, which is used for combining processing, is recorded in a run-length compression format with the image data representing the background image in the recording medium of the present invention. The combining processor pastes the picked-up or reproduced image on the background image in accordance with the mask pattern. Thus, the recording capacity for the mask pattern can be significantly compressed, and the number of background images or the recording space can be increased.

The recording medium of the present invention is able to contain image data representing a plurality of still images, is capable of being attached to and detached from equipment which is able to perform image combining processing with respect to readout image data, and is characterized in that image data representing a background image is recorded in a part of the recording medium in advance and is protected. According to the present invention, one recording medium can provide the image data representing the background image and record the image data therein, and it is possible to prevent the image data representing the background image from being erased by mistake.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a perspective view illustrating the electronic camera to which the electronic camera accessory of the present invention is applied;

FIG. 2 is a perspective view illustrating the back of the electronic camera in FIG. 1;

FIG. 9 is a flow chart showing the sequence of direct print processing;

FIGS. 10(a) and 10(b) are views illustrating an example of the arrangement of thumbnails in the index printing:

FIG. 10(a) is a view illustrating the size of each frame and the interval between frames, and FIG. 10(b) is a view illustrating the arrangement of all frames;

FIG. 11 is a flow chart showing the sequence of sequential image-capturing;

FIG. 18 is a flow chart showing the normal image-capturing process and the process of directly printing the composite image which is composed from the background image and the captured image, corresponding to the process in FIG. 17;

FIG. 19 is a flow chart showing a modification example of the process in FIG. 17; and FIG. 20 is a flow chart showing the normal image-capturing process, the process of directly printing the captured image, and the process of directly printing the composite image which is composed from the background image and the captured image, corresponding to the process in FIG. 19.

DETAILED DESCRIPTION OF THE PREFERRED EMBODIMENTS

Figure 3:
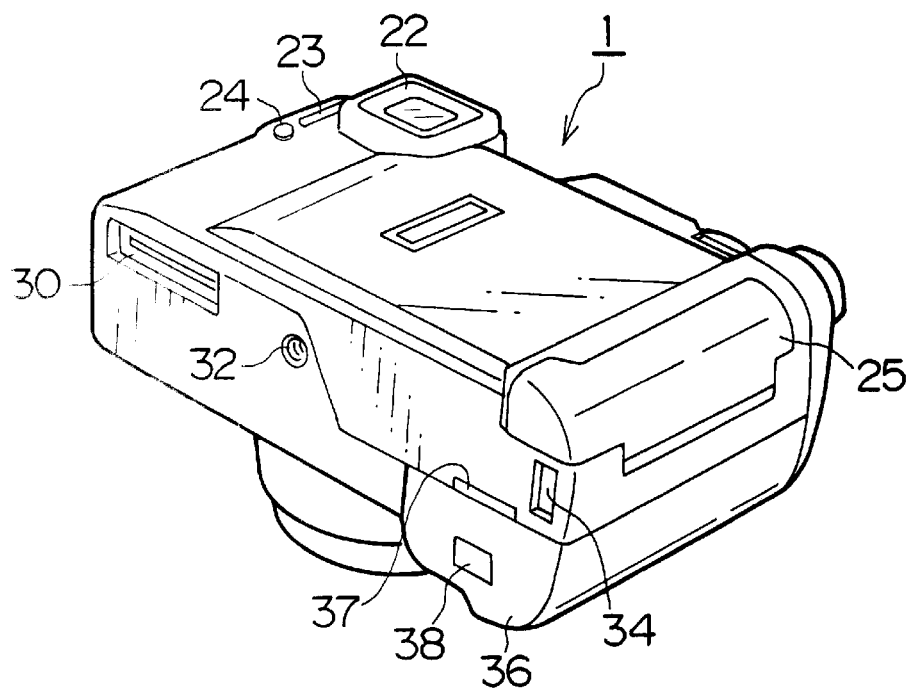
FIG. 3 is a perspective view illustrating the bottom of the electronic camera in FIG. 1.

This invention will be described in further detail by way of example with reference to the accompanying drawings.

FIG. 1 is a perspective view illustrating an electronic camera to which an electronic camera accessory according to the present invention is attached. A lens barrel 3 in which a taking lens 2 is mounted is attached to the center of the front face of the electronic camera 1. A strobe window 4, a finder window 5 and a photometry sensor 8 are provided above the taking lens 2. An auto-focus (AF) light projecting window 6 and an AF light receiving window 7 are provided at the right side of the finder window 5.

The taking lens 2 is a zoom lens, which is able to change a focal length by a driving force of a motor (not shown) which is controlled by manipulation of a zoom lever 20 (see FIG. 2) provided at the back of the electronic camera 1. Although not illustrated in detail, a zoom finder is provided at the interior of the finder window 5, and the zoom finder includes a movable lens group which constructs an objective lens and is driven in connection with the change in the focal length of the taking lens 2.

A light projecting device such as an infrared light emitting diode is provided at the inside of the AF light projecting window 6, and a light receiving device such as a photo diode is provided at the inside of the AF light receiving window 7. The light projecting device and the light receiving device construct an AF part which measures the distance to a subject. The AF part measures the distance to the subject based on the triangulation for example, and the results of the measurement are used for AF control.

A release button 9, a mode dial 10, an up/down dial 11, an accessory shoe 12, and a liquid crystal display (LCD) panel 13 are provided at the top of the electronic camera 1. A strobe button 14, an erase button 15 and a macro button 16 are provided at the right side of the LCD panel 13.

The mode dial 10 is provided in a manner that is rotatable forward and backward, and the modes of the electronic camera 1 can be changed according to the set position of the mode dial 10. For example, when the mode dial 10 is rotated forward, the mode of the electronic camera 1 is sequentially changed from "OFF" to "AUTO", "SETUP", "P", "S", "A", "M", "PC" and "PLAY", and then the mode returns from "PLAY" to "OFF" and a rotation of the mode dial 10 is completed. When the mode dial 10 is set at the OFF position, a mechanism (not shown) locks the mode dial 10, so that it is possible to prevent the incorrect manipulation resulting from an unreasonable force from the outside. A lock release button 17 is provided adjacent to the mode dial 10, and the lock release button 17 is pressed to release the mode dial 10 when the mode dial 10 is rotated from the "OFF" position to another position.

The "OFF" mode is set when the electronic camera 1 is not used, and the power of the electronic camera 1 is off in the "OFF" mode. The "AUTO" is a mode for full-automatic exposure (image-capturing). In the "AUTO" mode, the AF and automatic exposure control (AE) effectively function, and thus a user can take a picture only by pressing the release button 9.

The "SETUP" is a mode for setting the date and time, the sensitivity correction and a compression mode, etc. In the "SETUP" mode, the up/down dial 11 and a later-described set button 23 (see FIG. 2) are operated to set a variety of parameters on the LCD panel 13. In order to set the date, the mode dial 10 is set to "SETUP", and then the up/down dial 11 is rotated so that the date can be shown on the LCD panel 13. When the set button 23 is pressed, "year" starts blinking, and the up/down dial 11 is rotated to change numerical values while the set button 23 is being pressed. When the set button 23 is released at a desired value, "year" is set. "month", "day", "hour", and "minute" are set in the same manner.

The "P" is a mode for program AE, the "S" is a mode for shutter speed priority AE, the "A" is a mode for aperture priority AE, and the "M" is a mode for manual exposure. In each exposure mode, the up/down dial 11 and the set button 23 are operated to set program selection, shutter speed setting, aperture setting, etc.

The "PC" is a mode for sending/receiving image data to and from a personal computer, which connects to the electronic camera 1 via a cable. The "PLAY" is a mode for reproducing the recorded image, and one-frame reproducing and direct reproducing can be performed in this mode. An image display such as an LCD monitor is required to reproduce the captured image. An LCD monitor or a TV monitor connects to the electronic camera 1 via a video cable, or a personal computer connects to the electronic camera 1 via an accessory unit 40 (see FIG. 4) which will be described later, so that the captured image can be displayed on the LCD monitor, etc. or the display of the personal computer.

The strobe button 14 is used to set whether the strobe is used or not in the exposure modes. The erase button 15 is used for instructing to erase the image data stored in a memory card.

The LCD panel 13 shows the state of each set switch, the available amount of a battery, how much memory has been used, and the like.

FIG. 2 is a perspective view illustrating the back face of the electronic camera 1 in FIG. 1. The zoom lever 20 is provided at the back of the electronic camera 1, and the zoom lever 20 is moved up or down to change the focal length of the taking lens 2 to a long focal length side (telephoto) or a short focal length side (wide). An eyepiece 22 of the finder is formed at the upper left corner of the back face of the electronic camera 1. Through the eyepiece 22, the user is able to observe a visual field which is substantially equal to a photographic angle of view.

The set button 23 and an AF/MF (manual focus) button 24 are provided at the left side of the eyepiece 22 of the finder. The set button 23 as well as the up/down dial 11 is used to set a variety of parameters as stated above.

If the AF is selected by means of the AF/MF button 24, the abovementioned focusing part measures the subject distance in response to the pressing operation of the release button 9. A lens driving mechanism (not shown) drives the taking lens 2 to focus in accordance with the measured subject distance. If the MF is selected by means of the AF/MF button 24, the set button 23 and the up/down dial 11 are operated so that the lens driving mechanism (not shown) drives the taking lens 2 in accordance with the set subject distance. The AF/MF button 24 is also used as an execution button for printing the reproduced image.

A memory card chamber lid 25 is provided on a hinge 26 at the right side of the electronic camera 1 in FIG. 2. A chamber for mounting a memory card is formed inside the electronic camera 1. The memory card chamber lid 25 is opened so that the memory card can be inserted into the electronic camera 1 or the memory card can be pulled out from the electronic camera 1.

A transparent memory card chamber window 27 is formed at the center of the back face of the electronic camera 1. Through the window 27, it is possible to see whether the memory card is mounted in the electronic camera 1 or not.

FIG. 3 is a perspective view illustrating the bottom face of the electronic camera 1 in FIG. 1.

At the bottom of the electronic camera 1, there is provided an accessory terminal 30, through which the electronic camera 1 electrically connects to an accessory unit 40 which will be described later, a tripod screw hole 32, and an accessory unit attachment hole 34. The tripod screw hole 32 is also used for fixing the accessory unit 40. The accessory unit attachment hole 34 is formed so that that the interior thereof is L-shaped. Thus, an L-shaped hook 44 (see FIG. 4) of the accessory unit 40 can hook in the accessory unit attachment hole 34.

A battery chamber lid 36 is provided on a hinge 37 at the bottom of the electronic camera 1. A battery chamber lid latch 38 on the battery chamber lid 36 is operated to open the battery chamber lid 36 so that batteries can be changed.

Figure 4:
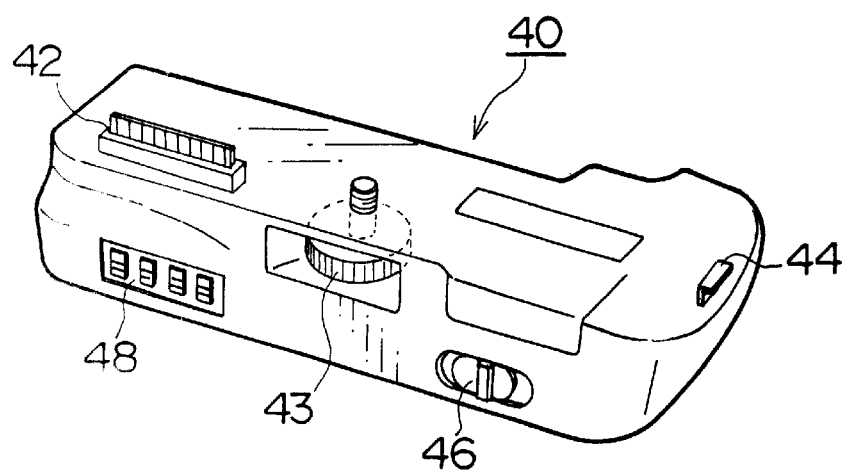
FIG. 4 is a perspective view illustrating the accessory unit attached to the bottom of the electronic camera in FIG. 1.

A description will be given of the accessory unit 40 which is attached to the bottom of the electronic camera 1. FIG. 4 shows the accessory unit 40 viewed from back.

The accessory unit 40 is equivalent to an electronic camera accessory according to the present invention. A connector 42, which fits to the accessory terminal 30 of the electronic camera 1, a fixing screw 43, and the substantially L-shaped hook 44 are provided at the top of the accessory unit 40. The hook 44 catches the accessory unit attachment hole 34 of the electronic camera 1, and the fixing screw 43 catches the tripod screw hole 32. Thus, the accessory unit 40 can be attached to the bottom of the electronic camera 1, and the electronic camera 1 and the accessory unit 40 can electrically connect through the accessory terminal 30 and the connector 42. For example, 40-pin terminal and connector are used as the accessory terminal 30 and the connector 42.

Figure 5:
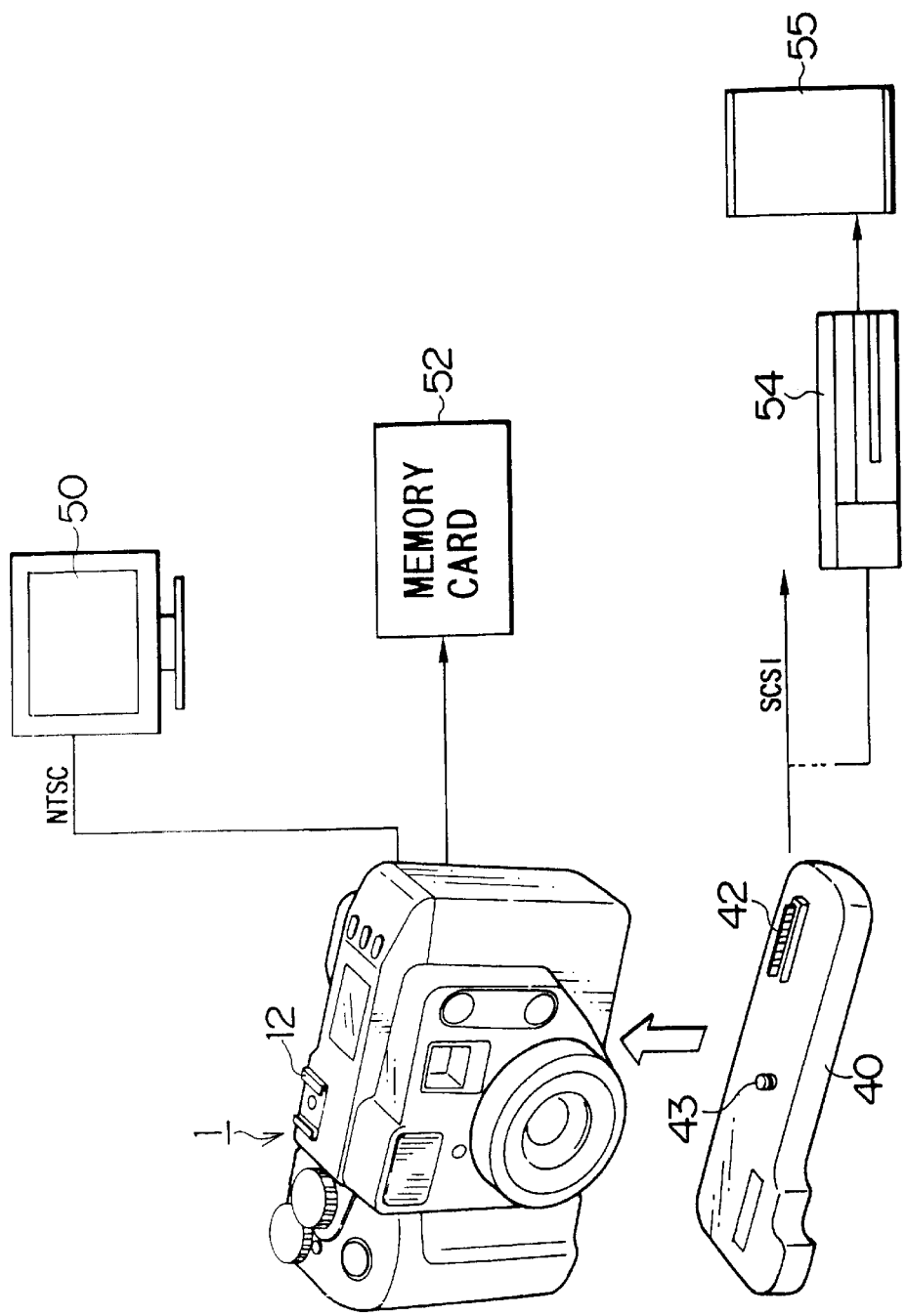
FIG. 5 is a view illustrating the construction of the system in which the electronic camera in FIG. 1 is combined with the accessory unit in FIG. 4.
Figure 6:
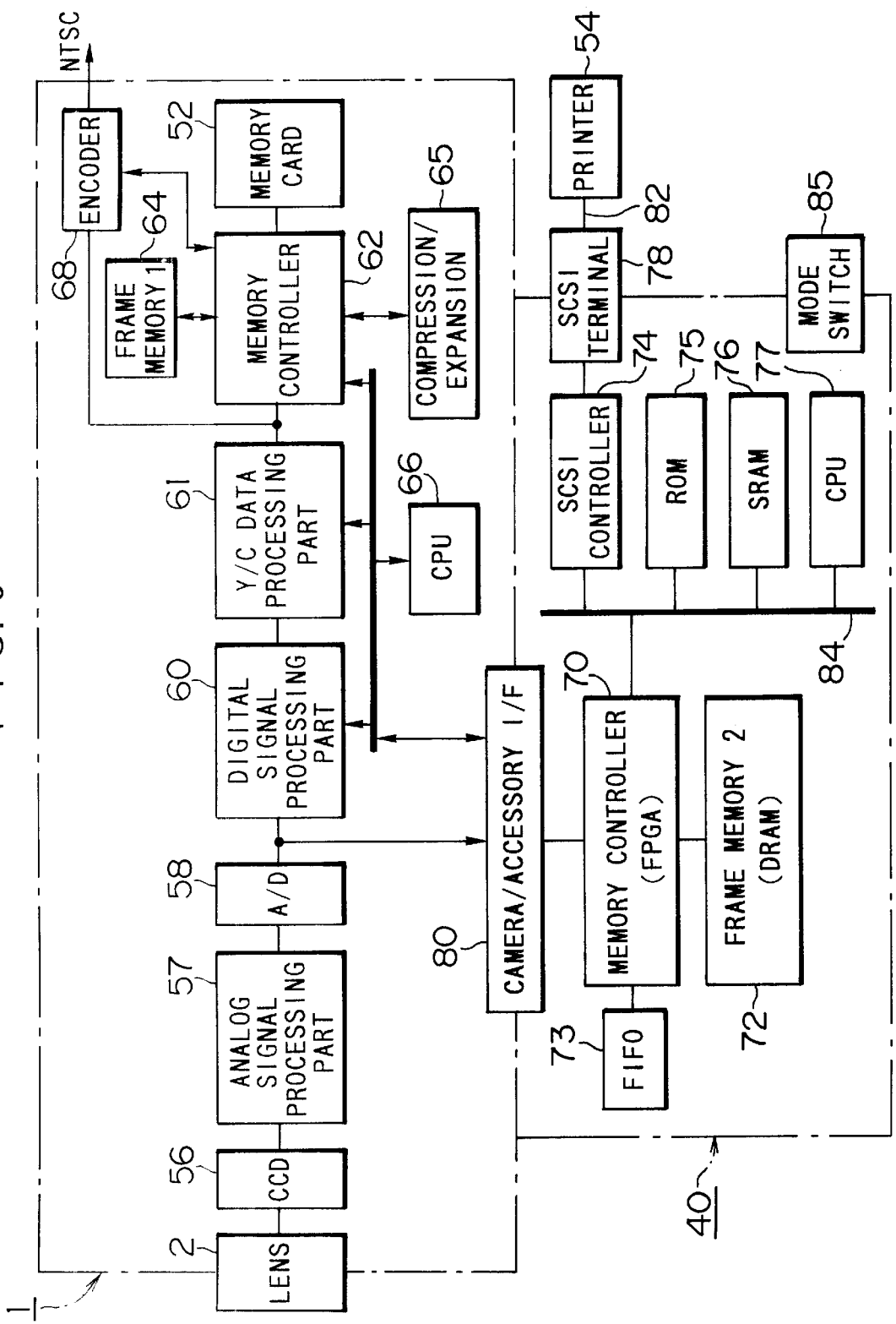
FIG. 6 is a block diagram illustrating an example of the inner construction of the electronic camera and the accessory unit.

A 25-pin SCSI (Small Computer System Interface) terminal 78 (see FIG. 6) is provided at the left side of the accessory unit 40, so that the accessory unit 40 can directly connect to the personal computer or a printer 54 via a SCSI cable (see FIGS. 5 and 6).

A slide switch 46 and a dip switch 48 are provided at the back face of the accessory unit 40. The slide switch 46 is a three-position slidable switch, which is used to change modes of the accessory unit 40 to sequential image-capturing, OFF and SCSI. For example, the central position of the switch 46 corresponds to the OFF mode, the left position to the sequential image-capturing mode, and the right position to the SCSI mode. When the switch 46 is set at the OFF position, the accessory unit 40 is in a power saving mode to thereby prevent the consumption of the battery which is mounted in the electronic camera 1. Thus, it is substantially equal to the state where the accessory unit 40 is not attached to the electronic camera 1.

When the slide switch 46 is set to the sequential image-capturing position, the later-described sequential image-capturing can be performed while the release button 9 is pressed. When the slide switch 46 is set to the SCSI position, the data is transferred between the electronic camera 1 and the personal computer or the printer 54 which connects to the accessory unit 40 via the SCSI terminal 78. In other words, the electronic camera 1 can transfer the captured image data to the personal computer through the accessory unit 40, and the personal computer can control the electronic camera 1 through the accessory unit 40. On the other hand, the electronic camera 1 can directly transfer the captured image data to the printer 54 through the accessory unit 40 so as to print the image without the personal computer. Hereinafter, this printing method in which the accessory unit 40 directly connects to the printer 54 via the SCSI cable so as to print the image without the personal computer, etc. will be referred to as a direct printing.

On the other hand, the dip switch 48 is a four-switch up/down type, and detailed setting is performed in the SCSI mode with a combination of the four switches. In other words, if the SCSI mode is selected by means of the slide switch 46, the dip switch 48 sets a PC operation mode, which validates the connection with the personal computer, or a direct printing mode, which validates the connection with the printer to make the direct printing possible. The dip switch 48 also sets an ID of the SCSI in the PC operation mode, and sets a size of sheet in the direct printing mode.

For example, the four switches of the dip switch 48 are named DSW1, DSW2, DSW3 and DSW4 from the left. The PC operation mode is set when the DSW4 at the right end is on, and the direct printing mode is set when the DSW4 is off. If the DSW4 is on and the DSW1 is off, the printing of an index image is set. If the DSW4 is on and the DSW1 is on, the printing of one-frame image is set. If the DSW2 is on, the L-size sheet (e.g. 297 mm×210 mm: A4 size in Japanese Industrial Standard) is set, and if the DSW2 is off, the S-size sheet (e.g. 210 mm×149 mm: A5 size) is set. The size of sheet may be decided by a sheet tray of the connected printer, and the setting of the DSW2 is invalidated in this case.

FIG. 5 illustrates the construction of a system in which the accessory unit 1 in FIG. 4 is mounted on the electronic camera 1 in FIG. 1. The electronic camera 1 has a video output terminal (not shown), through which the captured image data in a predetermined signal format such as NTSC (National Television System Committee) is transferred. The video output terminal connects to an image display such as an LCD monitor 50 and a TV monitor, so that the captured image can be seen. The LCD monitor 50 is preferably mounted on the accessory shoe 12 of the electronic camera 1. In this embodiment, the image display is constructed independently of the electronic camera 1, but the LCD monitor, etc. may be integrated with the electronic camera 1 on the back face.

A memory card 52 is mounted in the electronic camera 1, and the captured image data is recorded in the memory card 52 in a predetermined format. The recording method is based on Exif (Exchangeable Image File Format) for example. A set of image data which is compressed in JPEG format and thumbnail data of 80×60 pixels is recorded for each captured frame. The thumbnail data is produced by decreasing the captured image data of 1280×1000 pixels to $\frac{1}{16}$.

The following four compression modes are provided: "Fine" (4 bit/pel with thumbnail), "Normal" (2 bit/pel with thumbnail), "Basic" (1 bit/pel with thumbnail), and "No" (not compress). The up/down dial 11 and the set button 23 are operated when the mode dial 10 is set to "SETUP" as previously described with reference to FIG. 1, so that one of the four modes can be selected. If "No" mode is set, the image data is recorded in TIFF (Tagged Image File Format).

A PC card or a smartmedia (e.g. SSFDC: Solid State Floppy Disk Card) which is compatible with the PC card by means of a PC card adapter, is used for the memory card 52. The memory card 52 can be pulled out from the electronic camera 1, and it can be inserted into a laptop computer which has a PC card slot, and a PC card reader, and thus, the image data can be utilized in a variety of equipment. For this reason, the image data can easily be sent via communication lines.

The accessory unit 40, which is attached to the bottom of the electronic camera 1, may directly connects to the printer 54 via the SCSI cable. The two-way communication is performed between the printer 54 and the accessory unit 40, and the connected printer 54 transfers the information about the type of the printer, the size of sheet, etc. to the accessory unit 40.

On the other hand, the accessory unit 40 prepares data for printing an image by adjusting the color, size, etc. of the image in accordance with the printing mode which is set by the dip switch 48, the type of the connected printer 54, and the size of sheet. Then, the accessory unit 40 transfers the printing data to the printer 54. For example, in a mode for printing a list of thumbnails (an index image), the accessory unit 40 prepares data for printing by adjusting the size of each frame and the arrangement of the frames on the print in accordance with the type of the connected printer 54 and the size of sheet, and the accessory unit 40 transfers the printing data to the printer 54. The printer 54 which has received the printing data prints the index image on a preset sheet of paper 55.

FIG. 6 is a block diagram illustrating an example of the inner construction of the electronic camera 1 and the accessory unit 40. The electronic camera 1 includes the taking lens 2, a charge coupled device (CCD) 56, an analog signal processing part 57, an A/D converter 58, a digital signal processing part 60, an Y/C data processing part 61, a memory controller 62, a frame memory 64 (referred as "frame memory 1" in the drawing), a data compression/expansion processing part 65, a central processing unit (CPU) 66, an encoder 68, and the memory card 52.

On the other hand, the accessory unit 40 includes a memory controller 70, a frame memory 72 (referred as "frame memory 2" in the drawing), a FIFO (first-in first-out) processing part 73, a SCSI controller 74, a ROM (Read Only Memory) 75, an SRAM (Static Random Access Memory) 76, a CPU 77, the SCSI terminal 78, and a mode switch 85. The electronic camera 1 and the accessory unit 40 connects via a camera/accessory interface 80 which is equivalent to the accessory terminal 30 described with reference to FIG. 3. The printer 54 connects to the SCSI terminal 78 of the accessory unit 40 via the SCSI cable 82.

The taking lens 2 forms light from the subject on a light receiving surface of the CCD 56. The CCD 56 is a ⅔ inch 1.3 million pixels type of sensor, for example, and the image light formed on the light receiving surface of the CCD 56 is electrically charged for a predetermined time in each sensor provided with red (R), green (G) or blue (B) filter. Then, the image light is converted into RGB signals in accordance with the intensity of light.

The RGB signals are transferred to the analog signal processing part 57, which controls a gain, etc. of the RGB signals. From the analog signal processing part 57, the RGB signals are transferred to the A/D converter 58 and are converted into digital signals. Then the digital signals are transferred to the digital signal processing part 60.

The digital signal processing part 60 includes a white balance adjusting circuit, a γ-correction circuit and an RGB simultaneous circuit, etc., and processes the sequentially-input dot-sequential RGB signals in each circuit. Then, the digital signal processing part 60 transfers the simultaneously-output RGB data to the Y/C data processing part 61.

The Y/C data processing part 61 generates a luminance signal Y and a chroma signal $C_{r/b}$ (hereinafter referred to as Y/C data) in accordance with the input RGB data, and transfers the Y/C data to the memory controller 62.

The memory controller 62 controls write/read of the Y/C data in the frame memory 64, and controls write/read of the Y/C data in the memory card 52.

When the Y/C data is recorded in the memory card 52, the Y/C data from the Y/C data processing part 61 is transferred first to the data compression/expansion processing part 65, which compresses the data in the predetermined compression mode. Then, the compressed Y/C data is recorded in the memory card 52.

To reproduce the image recorded in the memory card 52, the compressed Y/C data is read from the memory card 52 and is expanded by the data compression/expansion processing part 65. Then, the Y/C data is transferred to the encoder 68, which generates NTSC color composite video signals for example in accordance with the input Y/C data. The video signals are output to the video output terminal via a D/A converter (not shown).

The uncompressed Y/C data, which is output from the Y/C data processing part 61 or is read from the frame memory 64 by the memory controller 62, may be transferred to the encoder 68. A synchronous signal generating circuit (not shown) supplies a synchronous signal of a preset cycle to the memory controller 62, the encoder 68 and the D/A converter, so that the circuits can be synchronized. The synchronous signal generating circuit, the digital signal processing part 60, the Y/C data processing part 61 and the memory controller 62 are controlled in accordance with control signals from the CPU 66.

A description will hereunder be given of the accessory unit 40.

The dot-sequential RGB data transferred from the A/D converter 58 of the electronic camera 1 and the Y/C data read by the memory controller 62 of the electronic camera 1 are transferred to the memory controller 70 of the accessory unit 40 via the camera/accessory interface 80.

The memory controller 70 controls write/read of the RGB data in the frame memory 72, and write/read of the Y/C data in the frame memory 72. The memory controller 70 connects to the FIFO processing part 73, so that the data can be read from the frame memory 72 in an order that the data is stored in the frame memory 72.

In other words, the FIFO processing part 73 is arranged between the memory controller 70 and the frame memory 72 so that the image data is recorded in the frame memory 72 after the image data is temporarily retained by the FIFO processing part 73. Thus, by using the FIFO processing part 73 as an image data buffer, the memory controller 70 can randomly refresh the frame memory 72 and switch pages (switch the data horizontally) on the frame memory 72. The memory area in the frame memory 72 can be used in linear format, and the memory capacity can be effectively used.

Figure 8:
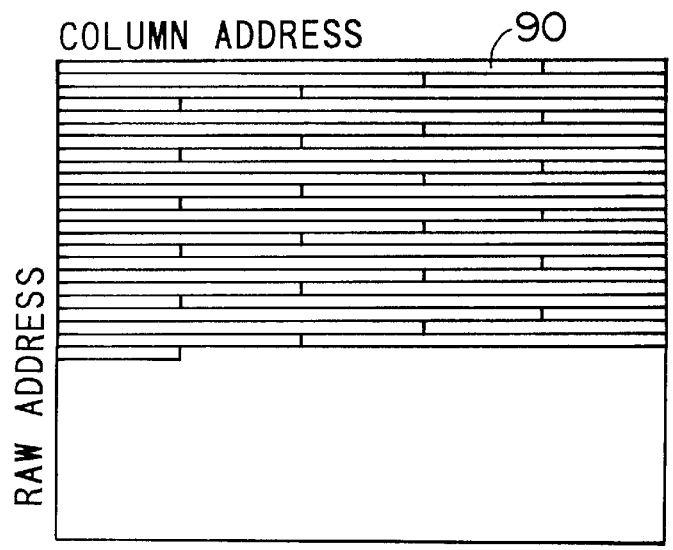
FIG. 8 is a conceptional view describing a format of using the frame memory in the accessory unit according to the present invention.

Accordingly, the memory controller 70 handles the image data as the sequential data and linearly writes the image data in memory space (see FIG. 8). How to use the memory space will be further described later.

For example, DRAM (Dynamic Random Access Memory) of 16 MB is used for the frame memory 72, which contains the RGB data and the Y/C data. The frame memory 72 is also used as a buffer for processing the captured image.

The ROM 75 contains a control program and a plurality of color correction look-up tables (LUT) suitable to types of printers. The SRAM 76 is used as a work memory for processing the image data such as converting the Y/C data into the RGB data. The memory controller 70, the ROM 75, the SRAM 76 and the SCSI controller 74 connect to the CPU 77 via the data bus 84. The CPU 77 is supplied with a setting signal from the mode switch 85 which is equivalent to the slide switch 46 and the dip switch 48.

The CPU 77 outputs a variety of control signals in accordance with input data such as the setting signal, which is output from the mode switch 85, and the printer information, which is transferred from the printer 54 through the SCSI controller 74. A variety of data is transferred between the memory controller 70, the ROM 75, the SRAM 76 and the SCSI controller 74 in accordance with the control signals, and thus, a preset data processing is executed.

For example, when an image is printed on the printer 54, the CPU 77 recognizes the type of the printer 54 and the size of sheet in accordance with the printer information. Then, the CPU 77 calls the color correction LUT applied to the connected printer 54 from the ROM 75 to thereby adjust the color of the image according to the printer 54. If the index image printing mode is set, the thumbnails of the frames are properly arranged in accordance with the size of sheet. Thus, the CPU 77 prepares and transfers the printing data to the SCSI controller 74, and the printing data is set in the data bus of the SCSI. Then, the printing data is transferred to the printer 54.

A description will be given of how to use the memory space in the frame memory 72 of the accessory unit 40.

Figure 7:
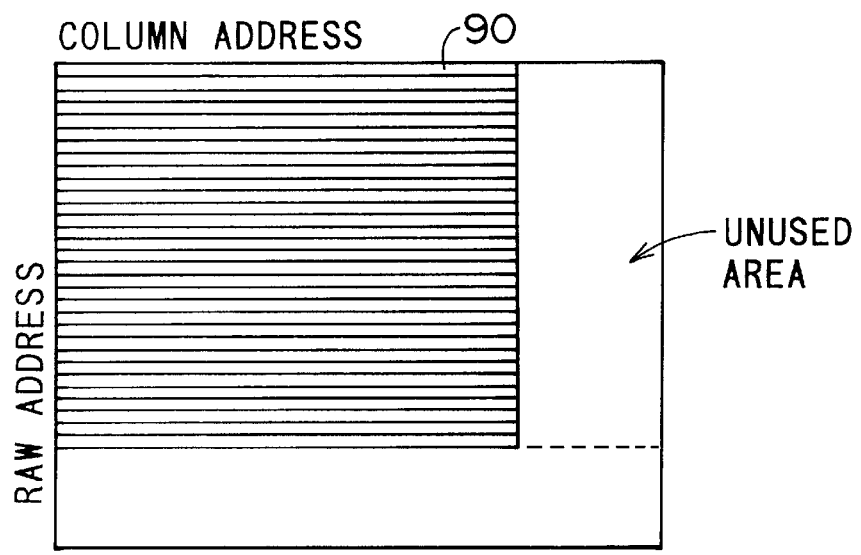
FIG. 7 is a conceptional view describing a format of using a memory according to a related art.

FIG. 7 is a view describing how to use memory space according to a related art, and FIG. 8 is a view describing how to use the memory space of this embodiment according to the present invention.

A memory controller of the related art maps a frame memory over X-Y coordinates space, and two-dimensionally controls the image data in the frame memory. In other words, the memory controller of the related art sequentially refreshes the frame memory at high speed and switches the pages by horizontal/vertical blanking period. Thereby, image data 90 of each frame is recorded each line in the memory space as shown in FIG. 7, and thus, there is an unused area in the memory space. Thus, there is a disadvantage because the memory cannot be effectively used.

On the other hand, in this embodiment, the FIFO processing part 73 temporarily retains the image data, and thereby, the memory controller 70 can randomly refresh the frame memory 72 and switch the pages on the frame memory 72 so that the memory can be used in the linear format.

In other words, the memory controller 70 handles the image data, which are sequentially obtained during sequential image-capturing, as the sequential data in the memory space. As shown in FIG. 8, the memory controller 70 one-dimensionally writes the image data of a plurality of frames. That is, the memory controller 70 writes one-frame image data 90 and then writes the next frame image data without changing the lines. Thus, there is no unused area in the memory space, and the memory can be efficiently used.

As stated above, by using the memory space in the linear format, the sequential image-capturing can be performed with a small capacity of memory. For example, if image data of one frame is 1280×1000 pixels, twelve frames can be sequentially captured with the 16 MB memory in the linear format, whereas six frames can be sequentially captured with the 18 MB memory in the X-Y format.

A description will hereunder be given of the operation of the electronic camera and the accessory unit which are constructed in the abovementioned manner.

First, it is made sure that the mode dial 10 of the electronic camera 1 is set to "OFF". Then, the hook 44 of the accessory unit 40 is hooked in the accessory unit attachment hole 34 of the electronic camera 1 so that the electronic camera 1 and the accessory unit 40 can properly connect. Then, the fixing screw 43 is tightened to fix the accessory unit 40 to the electronic camera 1. Further, the accessory unit 40 connects to the printer 54 through the SCSI cable 82.

Then, the slide switch 46 is set to the SCSI position, and the size of sheet is designated by means of the DSW2 of the dip switch 48. Thus, preparations for image-capturing is completed.

To print the captured image at the same time as the image-capturing, the mode dial 10 of the electronic camera 1 is set to "AUTO", "P", "S", "A" or "M". Immediately after the image-capturing is performed by pressing the release button 9, the captured image is printed (hereinafter referred to as captured image printing).

To reproduce the images recorded in the memory card 52 on a frame-by-frame basis and print the reproduced images, the DSW1 of the accessory unit 40 is turned on to set the one-frame printing, and the size of sheet is designated by means of the DSW2. Then, the mode dial 10 of the electronic camera 1 is set to "PLAY" so that an image to be printed can be reproduced. If the mode dial 10 is set to "PLAY", the image of the last frame recorded in the memory card 52 is reproduced and shown on the display such as the LCD monitor 50. While the reproduced images on the LCD monitor 50 are being looked at, the up/down dial 11 is operated to select a frame to be printed. When the AF/MF button 24 is pressed, the reproduced image is printed (hereinafter referred to as one-frame reproduced image printing).

To print the list of thumbnails for the images captured by the electronic camera 1, that is, the index image, the DSW1 of the accessory unit 40 is turned off to set the index printing mode, and the size of sheet is designated by means of the DSW2. Then, the mode dial 11 of the electronic camera 1 is set to "PLAY", and the image of the first frame to be printed is reproduced. The up/down dial 11 is operated to designate the first frame. Then, the AF/MF button 24 is pressed, and the list of thumbnails of the designated frame and the following frames is printed (hereinafter referred to as index printing).

FIG. 9 shows the sequence of the direct printing.

When the printing is started by pressing the release button 9 or the like from the printing waiting state (idle state) (S10), it is determined whether the reproduced image or the captured image is printed (S12). A description will hereunder be given of the captured image printing.

In the case of the captured image printing, the CCD data is captured from the CCD 56 described with reference to FIG. 6 (S14), and the RGB signals are converted into the Y/C data at the Y/C data processing part 61 (S16). The Y/C data output from the Y/C data processing part 61 is stored in the frame memory 64 without compressed (S22). In the flow chart of FIG. 9, the frame memory 64 of the camera is referred to as "frame memory 1", and the frame memory 72 of the accessory unit 40 is referred to as "frame memory 2".

Thereafter, the electronic camera 1 outputs a signal to the accessory unit 40 to instruct the execution of printing (S24).

The accessory unit 40 determines whether the reproduced image or the captured image is printed in accordance with the signal output from the electronic camera 1 (S26). In the case of the captured image printing, the uncompressed Y/C data is read from the frame memory 64 of the electronic camera 1, and the Y/C data is converted into the RGB data (S30). Then, the RGB data is stored in the frame memory 72 (S32).

Thereafter, the RGB data is color-corrected according to the LUT applied to the connected printer 54, and the corrected RGB data is transferred to the printer 54 (S34). Then, the accessory unit 40 outputs a signal to the printer 54 to instruct the execution of printing (S42), and the completion of print processing is waited (S44). When the print completion is posted from the printer 54, the processing returns to S10.

As stated above, in the captured image printing mode in this embodiment, since the data of the captured image is directly transferred to the printer 54 without compressing/expanding the data, the printing can be completed in a short period of time. Moreover, the personal computer is not necessary, and thus, the printing can be performed without operating the personal computer in a complicated manner.

In this embodiment, the image data is converted from the RGB data into the Y/C data when the image data is transferred to the accessory unit 40 in the captured image printing mode; however, the RGB data output from the A/D converter 58 may be directly transferred to the accessory unit 40 without the Y/C conversion.

A description will hereunder be given of the one-frame reproduced image printing.

If it is decided at S12 that the reproduced image is printed, the image data (the compressed Y/C data) of the designated frame is read from the memory card 52 (S18). The read image data is expanded at the data compression/expansion processing part 65 (S20), and the expanded Y/C data is stored in the frame memory 64 (S22).

Then, the electronic camera 1 outputs a signal to the accessory unit 40 to instruct the execution of printing (S24).

The accessory unit 40 determines whether the reproduced image or the captured image is printed in accordance with the signal output from the electronic camera 1 (S26). In the case of the reproduced image printing, it is determined whether the one-frame reproduced image printing or the index printing is performed (S28). If the one-frame reproduced image printing mode is set by means of the dip switch 48 of the accessory unit 40, the Y/C data is read from the frame memory 64 of the electronic camera 1, and the Y/C data is converted into the RGB data (S30). After that, the processing is equal to the above-mentioned S32–S44.

A description will be given of the index printing.

The index printing includes the processing from S10 to S28 of the one-frame reproduced image printing, of which explanations will not be repeated.

If it is determined that the index printing mode is set at S28, the thumbnail data of the frame which is currently designated is read from the memory card 52 of the electronic camera 1, and the Y/C data of the thumbnail data is converted into the RGB data (S36). Then, the thumbnail RGB data is stored in the frame memory 72 (S38). Thereafter, the RGB data is color-corrected according to the LUT applied to the connected printer 54, and the corrected RGB data is transferred to the printer 54 (S40).

The processing from S36 to S40 is repeated with respect to all frames following the designated frame, and it is confirmed that the RGB data of all thumbnails to be printed have already been transferred to the printer 54. Then, the accessory unit 40 outputs a signal to the printer 54 to instruct the execution of printing (S42), and the completion of print processing is waited (S44). When the print completion is posted from the printer 54, the processing returns to S10.

FIGS. 10(*a*) and 10(*b*) show an example of arrangement of thumbnails in the index printing. The accessory unit 40 automatically recognizes the type of the connected printer 54 and the size of sheet, and it adjusts the size of each frame image, the frame positions, the distance between frames, etc. to arrange the frames in view of the number of pixels and the resolution of the printer 54 and the size of sheet.

For example, if a sheet of 210 mm×149 mm (A5 size) is set in a printer, the size of each frame is 25.4 mm×19.1 mm, the interval between two horizontally adjacent frames is 2.0 mm, and the interval between two vertically adjacent frames is 7.9 mm. Thus, 7×5=35 frames or less are arranged on the whole sheet as shown in FIG. 10(*b*). The arrangement of the frames on the sheet may be determined so that the frame number can be increased rightward from the upper left corner in FIG. 10(*b*), or that the frame number can be increased downward from the upper right corner in FIG. 10(*b*). An arrangement pattern may be selected among a plurality of arrangement patterns.

A description will be given of the sequential image-capturing.

As is the case with the direct printing, the accessory unit 40 connects to the electronic camera 1, and the fixing screw 43 is tightened to fix them. The printer 54, however, is not necessary connected to the electronic camera 1. The slide switch 46 is set to the sequential image-capturing position. Thus, the sequential image-capturing function is validated, and the dip switch 48 is ignored.

FIG. 11 is a flow chart illustrating the sequence of the sequential image-capturing. When the release button 9 is pressed, the sequential image-capturing is started (S50) so that a subject image can be captured (S52). As previously described with reference to FIG. 6, the captured image data is processed at the analog signal processing part 57 (S54), and is analog-to-digital converted at the A/D converter 58 (S56). The dot sequential RGB data output from the A/D converter 58 is transferred to the memory controller 70 of the accessory unit 40 via the camera/accessory interface 80 (S58). In the flow chart of FIG. 11, the memory controller 70 is referred to as "sequential image-capturing memory controller", and the frame memory 72 is referred to as "sequential image-capturing memory". The RGB data is stored in the frame memory 72 via the memory controller 70 (S60).

Then, it is decided whether the sequential image-capturing is completed or not (S62). While the release button 9 is pressed, the image-capturing is sequentially performed at speed of 4.5 frames/sec. (in the case that the shutter speed is set to ¹⁄₆₀ or higher). If the sequential image-capturing continues with the release button 9 being pressed, the processing returns to S52. Thus, the captured images are sequentially stored as the uncompressed RGB data in the frame memory 72 during the sequential image-capturing. The maximum number of frames which can be captured during one sequential image-capturing depends on the capacity of the frame memory 72. If the maximum number of frames is twelve for example, the sequential image-capturing must stop when the image data of twelve frames are stored in the frame memory 72.

If the release button 9 is not pressed or if the sequential image-capturing of twelve frames is completed at S62, the completion of the sequential image-capturing is confirmed. Then, the processing of the image data stored in the frame memory 72 starts. In other words, the image data is read from the frame memory 72 on a frame-by-frame basis in an order in which the image data is stored in the frame memory 72 (S64). The image data is transferred to the digital signal processing part 60 of the camera 1 via the memory controller 70 (S66). As previously described with reference to FIG. 6, the digital signal processing part 60 and the Y/C data processing part 61 executes a predetermined digital signal processing to thereby generate the Y/C data (S68). Then, the Y/C data is compressed and recorded in the memory card 52 (S70).

When the image data of one frame is recorded in the memory card 52, it is confirmed whether the sequential image-capturing has been resumed or not (S72). If the release button 9 is not pressed, it is confirmed whether there is any unprocessed data in the frame memory 72 or not (S74). If there is some unprocessed data, the processing returns to S64, and the image data of the next frame is processed.

If the sequential image-capturing is not resumed for a predetermined period of time after completion of the sequential image-capturing at S62, and if the processing of the whole image data stored in the frame memory 72 is completed, the recording of the data with respect to the sequential image-capturing is finished (S76).

On the other hand, if there is space in the frame memory 72 with some data unprocessed (if the number of unprocessed images is below twelve in the frame memory 72), it is possible to resume the sequential image-capturing for the space in the frame memory 72. The processed data is erased by overwriting data.

If the sequential image-capturing is resumed at S72, the processing returns to S52, and the next image-capturing is started. The subsequent process was previously described.

As stated above, in this embodiment, the image data is sequentially stored as the uncompressed RGB data in the frame memory 72 during the sequential image-capturing. After completion of the sequential image-capturing, the image data is read in an order in which the image data is stored. Then, the image data is converted into the Y/C data and compressed, and is recorded in the memory card 52. Thus, the sequential image-capturing can be performed irrespective of the time required for signal processing (recording). There is another advantage because the recording can be suspended to allow the sequential image-capturing to be resumed, if there is a space in the frame memory 72. There is yet another advantage because the special functions such as direct printing and sequential image-capturing are provided in the form of the accessory unit, that is, the accessory for the electronic camera, the camera body can be compact and inexpensive.

A description will be given of an embodiment of an image composition system according to the present invention.

In this embodiment, the image composition system according to the present invention is applied to the above-mentioned camera system which is composed of the electronic camera 1 and the accessory unit 40. In other words, the electronic camera 1 in FIGS. 1–3 is equivalent to an electronic camera provided with image-composing function according to the present invention, and the accessory unit in FIG. 4 is equivalent to an image composing unit according to the present invention.

When the mode dial 10 in FIG. 1 is set to "PLAY", the mode for reproducing an image (a captured subject image or a previously-recorded background image) recorded in the memory card 52 is selected, and the background image can be captured in this mode. The AF/MF button 24 is also used as a background image selecting button for selecting and capturing the background image.

The accessory unit 40 connects to the bottom of the electronic camera 1 as shown in FIG. 5, so that the later-described image-composing function can be added to the electronic camera 1.

A description will hereunder be given of the memory card 52 which is used as a background image provider.

Data relating to a plurality (e.g. five) of background images is recorded in a part of the storage area of the memory card 52 in advance. The data about each background image includes a header and image data representing the background image as shown in FIG. 12.

Data for protecting the recorded data relating to the background image, an identification code indicating that the data relates to the background image, information about the origin of a pasting area and the size of the pasting area, a mask pattern representing the pasting area, and the like are recorded in the header.

Figure 12:
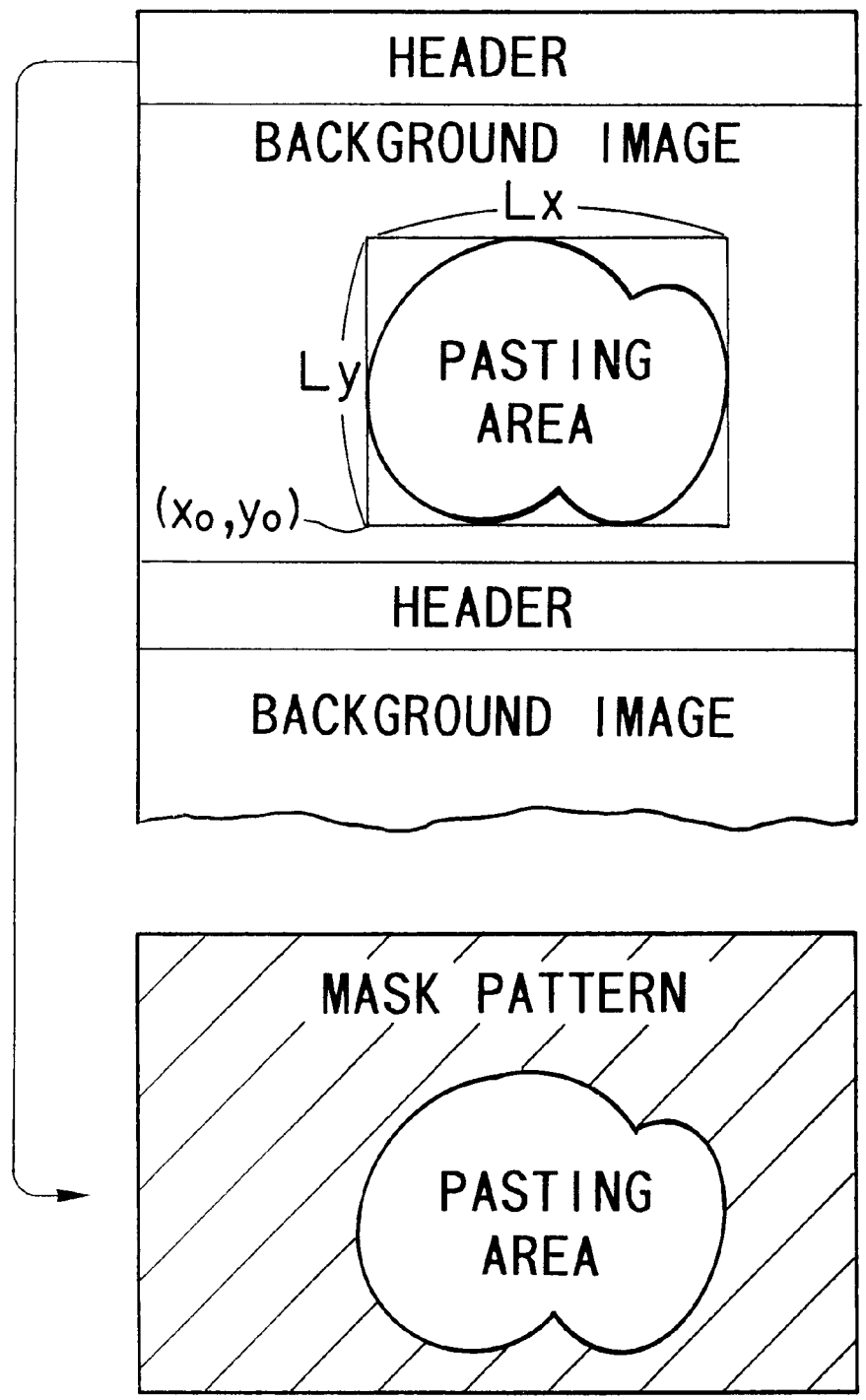
FIG. 12 is a view illustrating the structure of the data about the background image which is recorded in advance in the recording medium according to the present invention.

An example of the information about the origin of the pasting area, which is recorded in the header, is the coordinates $(x_0, y_0)$ at the lower left corner of a circumscribed square about the pasting area as shown in FIG. 12. Examples of the information about the size of the pasting area are the width $L_x$ and length $L_y$ of the square, the number of pixels of the width and length of the square, the coordinate data at four corners of the square, and the compression/expansion rate of the pasted image. The mask pattern is recorded in the bit map format and in the run-length compression format. Thereby, the recording capacity of the mask pattern is significantly compressed, and the background image including the mask pattern can be produced in the same size as a normal image. Thus, the background image can be recorded in the memory card of the particularly-restricted recording capacity.

On the other hand, the image data representing the background image is recorded at high resolution which is suitable for printing, in other words, at the resolution of the subject image data captured by the camera body 1 or higher resolution than that. The pasting area in the background image is painted over with a specific color (usually, black).

A description will be given of an image composing method for composing an image from the background image and the captured or reproduced image.

First, the mode dial 10 of the electronic camera 1 is set to "PLAY", which indicates the reproducing mode. While the reproduced image on the LCD monitor 50 is looked at, the up/down dial 11 is turned to reproduce the desired background image. When the background image selecting button (AF/MF button 24) is pressed, the image data representing the background image and the mask pattern thereof are recorded in the frame memory 72 (hereinafter referred to as a frame memory 2).

Then, when another reproduced image (except for the background image) is reproduced in the reproducing mode and the print button (AF/MF button 24) is pressed, or when the mode dial 10 of the camera body is set to "AUTO", "P", "S", "A" or "M" to set the image-capturing mode and the release button 9 is pressed, the image data representing the reproduced or captured image which is recorded in the frame memory 64 (hereinafter referred to as a frame memory 1) is combined with the image data representing the background image which is recorded in the frame memory 2.

Figure 13:
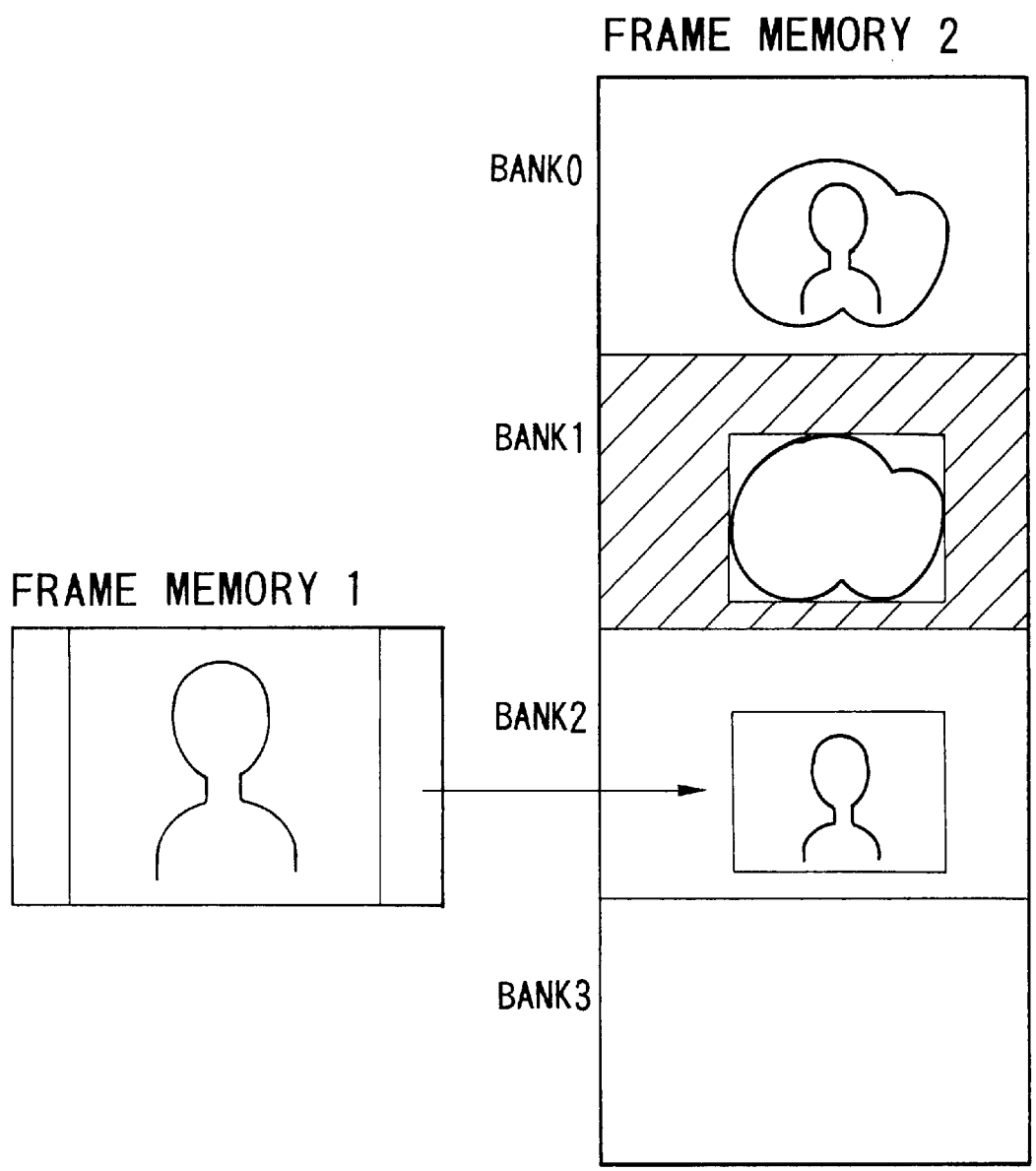
FIG. 13 is a view of assistance for explaining the method of composing an image from the background image and the captured or reproduced image.

In other words, the frame memory 2 in FIG. 13 is divided into four areas BANK 0, 1, 2, 3. The image data representing the background image is recorded in BANK0, and the run-length compressed mask pattern is expanded and recorded in BANK1. The image recorded in the frame memory 1 is trimmed in a manner to have the same aspect ratio as an aspect ratio of the pasting area in the background image. The size of image is expanded or compressed according to the size of the pasting area. Further, the processed image data is recorded in BANK2 of the frame memory according to the position of the origin of the pasting area. The abovementioned processing is executed in accordance with the information of the header shown in FIG. 12.

Then, the mask pattern recorded in BANK1 of the frame memory 2 is scanned. When the pasting area is detected at a scanning position, the image data at the same coordinates position as the coordinates of the scanning position where the pasting area is detected is read from BANK2, and the image data is stored at the coordinates position in BANK0. Thus, the image data, which is recorded in the frame memory 1, is combined with the image data representing the background image recorded in the frame memory 2. The image processing is performed so that the resolution of the background image and that of the image pasted onto the pasting area can be substantially equal (for example, the higher resolution is lowered so that the resolution of the two images can be equal).

A description will be given of the operation of the electronic camera with the image-composing function according to the present invention.

Figure 14:
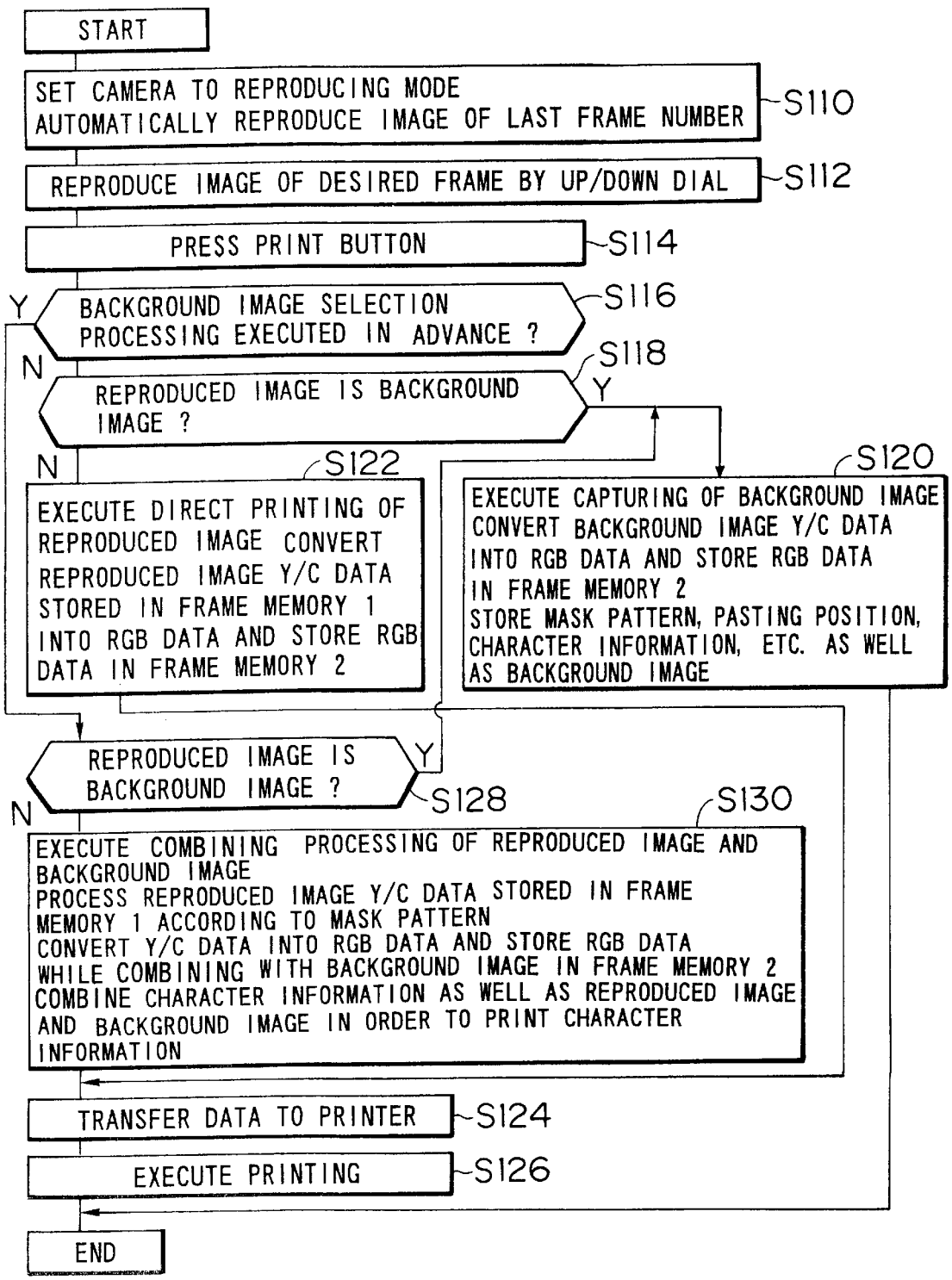
FIG. 14 is a flow chart showing the process of capturing the background image, the process of directly printing the reproduced image, and the process of directly printing the composite image which is composed from the background image and the reproduced image.

FIG. 14 is a flow chart showing a process of capturing the background image, a process of directly printing the reproduced image, and a process of directly printing the composite image which is composed from the background image and the reproduced image.

As shown in FIG. 14, the mode dial 10 is set to "PLAY", which indicates the reproducing mode (S110). In this case, the image in the last frame recorded in the memory card 52 is reproduced. Then, the image of the desired frame is reproduced by means of the up/down dial 11 (S112).

When the print button (AF/MF button 24) is pressed (S114), the processing goes on to S116, where it is determined whether the background image has already been selected or not. If the background image has not been selected yet, the processing goes on to S118, where it is determined whether the reproduced image is the background image or not. It is determined in accordance with the information of the header shown in FIG. 6; however, an identifier may be provided on the memory card which contains the data about the background image so that the camera can detect the identifier.

If the reproduced image is the background image, the background image is captured (S120). In other words, the image data (Y/C data) representing the background image recorded in the memory card 52 is converted into the RGB data, which is stored into the frame memory 2. In this case, the mask pattern, the pasting position, the character information, etc. are captured, too.

On the other hand, if it is determined at S118 that the reproduced image is not the background image, the reproduced image is directly printed (S122, S124, S126). In other words, the image data (Y/C data) representing the reproduced image recorded in the memory card 52 is converted into the RGB data, which is stored into the frame memory 2 (S122). Then, the RGB data is corrected according to the LUT applied to the connected printer 54, and the corrected RGB data is transferred to the printer 54 (S124). Thereafter, a signal is output to the printer 54 to instruct the execution of printing, and the completion of printing is waited. When the completion of printing is posted from the printer 54, the printing is finished.

If it is determined at S116 that the background image has already been selected at S120, the processing goes on to S128, where it is decided whether the reproduced image is the background image or not. If the reproduced image is decided as being the background image, the background image is captured again (rewritten) at S120.

If the reproduced image is decided as not being the background image at S128, the reproduced image is combined with the previously-captured background image (S130). In other words, the image data (Y/C data) represented the reproduced image recorded in the frame memory 1 is trimmed, expanded/compressed in size of the image, or the like in accordance with the mask pattern. The processed image data is stored in the pasting area of the background image in the frame memory 2, while the image data is converted into the RGB data. In order to print the character information such as the image-capturing date, the character information is combined. That is, information such as printing positions and the size and color of characters is included in the information about the background image. The information about the image-capturing conditions such as the image-capturing date, the shutter speed and the aperture setting are automatically combined in accordance with the information about the background image.

Then, the RGB data is transferred to the connected printer 54 to execute the printing (S124, S126).

Figure 15:
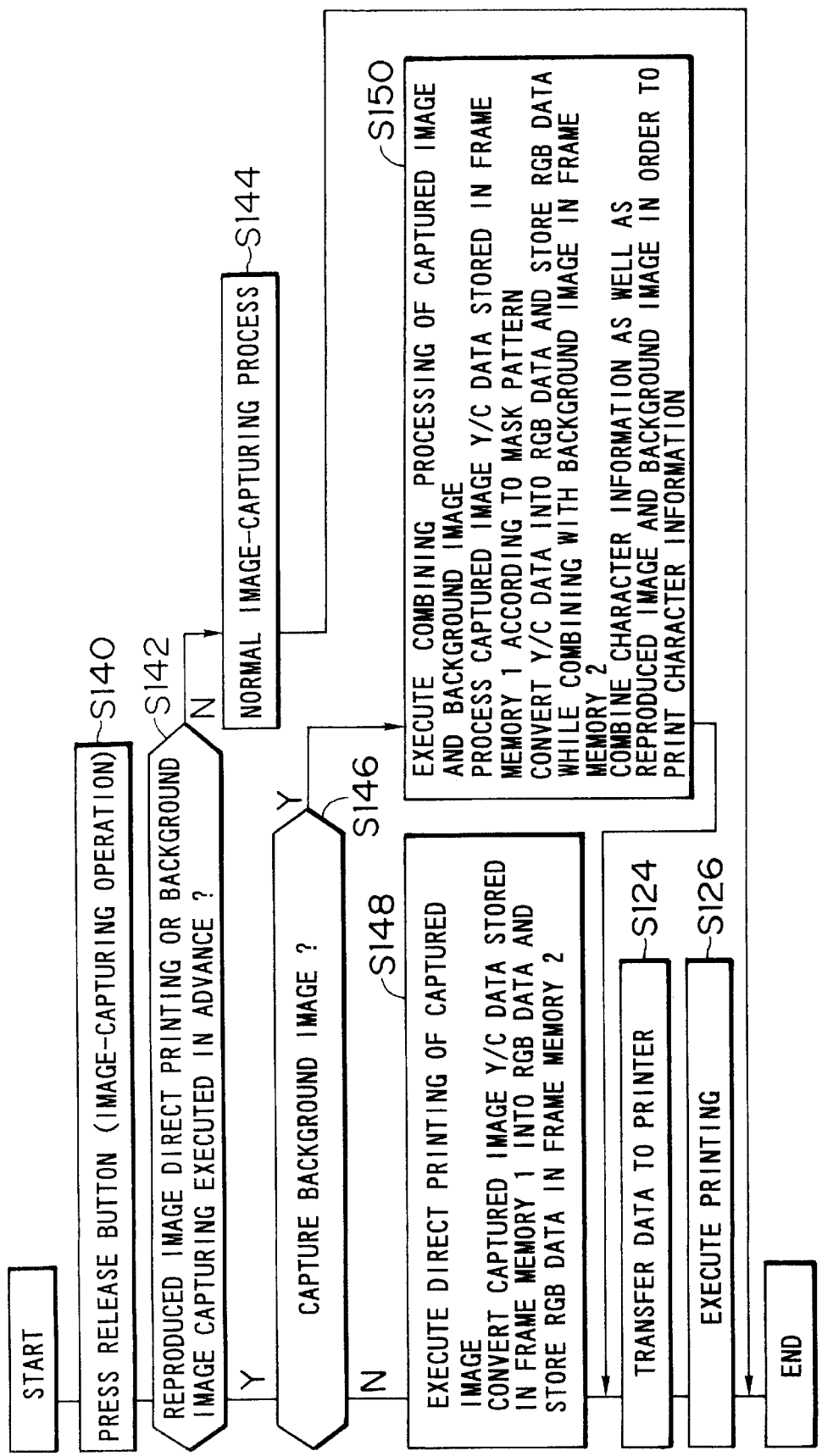
FIG. 15 is a flow chart showing the normal image-capturing process, the process of directly printing the captured image, and the process of directly printing the composite image which is composed from the background image and the captured image.

FIG. 15 is a flow chart showing a normal image-capturing process, a process of directly printing the captured image, and a process of directly printing the composite image which is composed from the captured image and the background image.

As shown in FIG. 15, the mode dial 10 is set to "AUTO", "P", "S", "A" or "M" to set the image-capturing mode, and the release button 9 is pressed (S140). Then, it is determined whether a predetermined process in the reproducing mode (a process of directly printing the reproduced image or capturing the background image (see FIG. 14)) has already been executed or not (S142). If the predetermined process has not been executed in the reproducing mode, the normal image-capturing is performed (S144).

On the other hand, if the predetermined process has already been executed in the reproducing mode, it is determined whether the background image has been captured or not (S146).

If it is determined at S146 that the background image has not been captured yet (i.e. the reproduced image was directly printed), the mode is decided as being the direct printing mode, and the captured image is directly printed (S148, S124, S126). In other words, the image data (Y/C data) representing the captured image recorded in the frame memory 1 is converted into the RGB data, and the RGB data is stored in the frame memory 2 (S148). Then, the RGB data is transferred to the connected printer 54 to execute the printing (S124, S126).

If it is determined at S146 that the background image has been captured (i.e. the mode is decided as being the captured image combining printing mode), the captured subject image and the previously-captured background image are combined (S150). In other words, the image data (Y/C data) representing the captured subject image recorded in the frame memory 1 is trimmed, expanded/compressed in size of the image, or the like in accordance with the mask pattern. The processed image data is stored in the pasting area of the background image in the frame memory 2, while the image data is converted into the RGB data. In order to print the character information such as the image-capturing date, the character information is combined. Then, the RGB data is transferred to the connected printer 54 to execute the printing (S124, S126).

Figure 16:
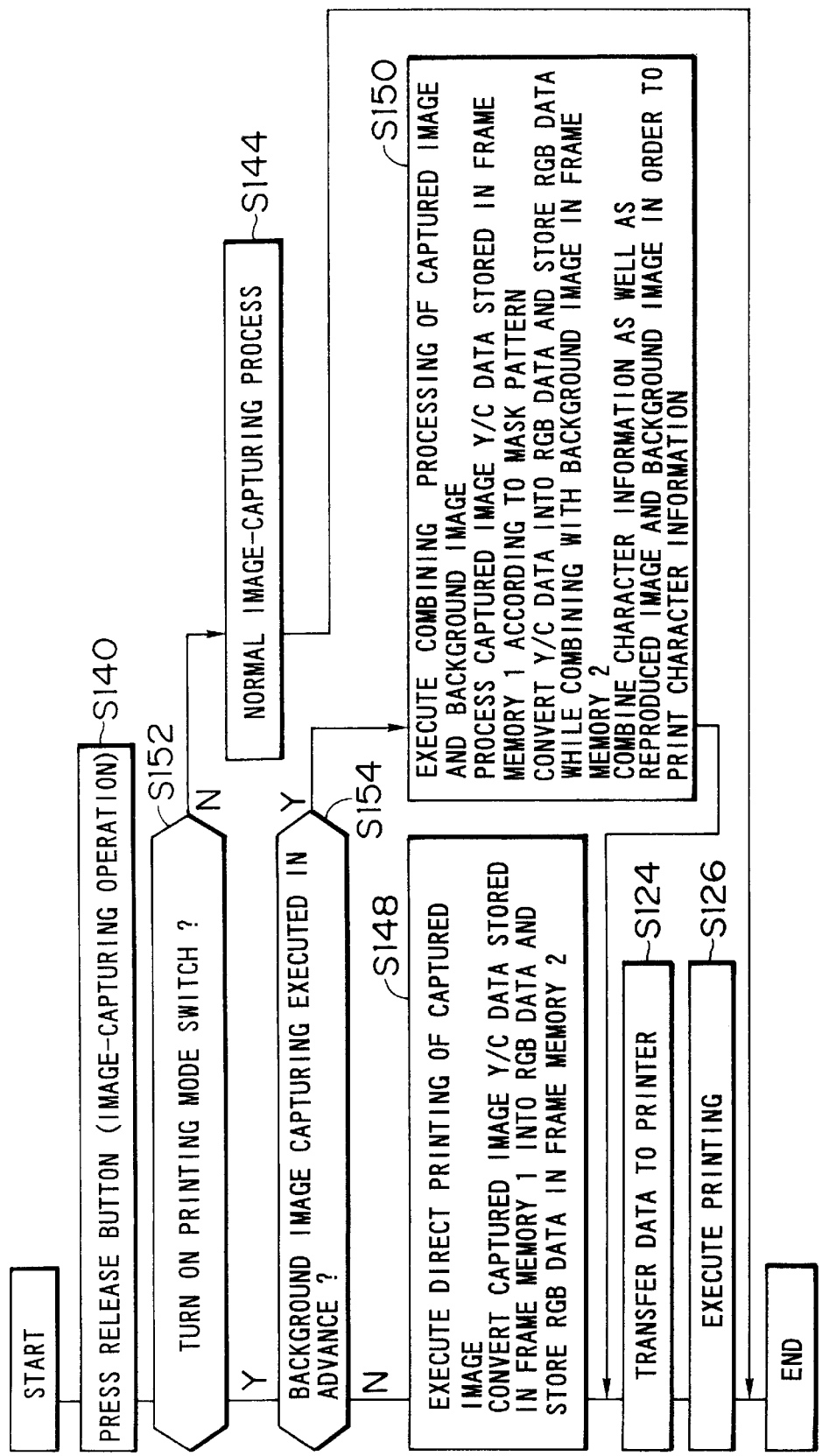
FIG. 16 is a flow chart showing a modification example of the process in FIG. 15.

FIG. 16 is a flow chart showing an example of the modified process of FIG. 15. The processes which are similar to those described with reference to FIG. 15 are denoted by the same reference numerals, and they will not be explained.

In FIG. 16, the processes at S152 and S154 are different from those described with reference to FIG. 15. In other words, it is determined at S152 whether the printing mode switch is on or off. Whether the printing mode switch is on or off is equal to whether the mode is the direct printing mode in which the SCSI mode is selected by means of the slide switch 46 and the dip switch 48 validates the connection with the printer to permit the direct printing.

If the mode is not the direct printing mode, the normal image-capturing is performed (S144). If the mode is the direct printing mode, the processing goes on to S154, where it is determined whether the background image has already been captured or not in the reproducing mode. If the background image has not been captured yet, the captured subject image is directly printed (S148, S124, S126). If the background image has already been captured, the composite image of the captured subject image and the previously-captured background image is directly printed (S150, S124, S126).

Figure 17:
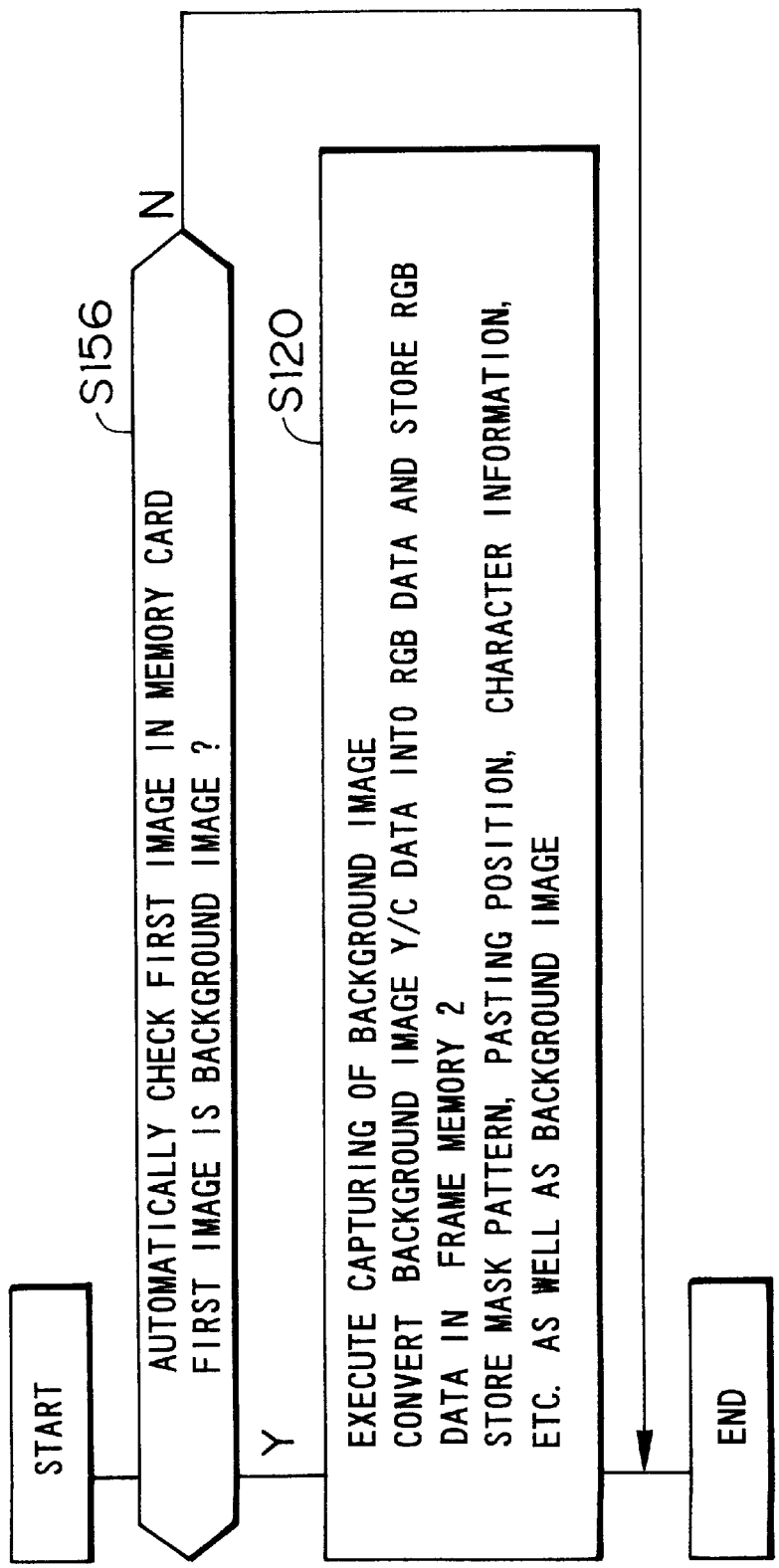
FIG. 17 is a flow chart showing another embodiment of capturing the background image.

FIG. 17 is a flow chart showing another embodiment of the background image capturing process.

As shown in FIG. 17, the electronic camera 1 automatically checks the first image data in the mounted memory card 52 (S156). If the first image data represents the background image, the electronic camera 1 starts capturing the first image data (S120). In other words, the memory card which contains the image data representing the background image as the first image data is a special one. If such a memory card is mounted in the camera body 1, the background image data is automatically captured into the frame memory 2 without selecting a mode, operating a switch, or the like.

FIG. 18 is a flow chart showing the normal image-capturing process and the process of directly printing the composite image which is composed from the captured image and the background image, corresponding to the process described with reference to FIG. 17.

As shown in FIG. 18, when the release button 9 is pressed (S140), the electronic camera 1 determines whether the first image data in the mounted memory card represents the background image or not (S158). If the first image data is decided as not representing the background image, the normal image-capturing is performed (S144). If the first image data is decided as representing the background image, the composite image of the captured subject image and the previously-captured background image, which is captured in the process described with reference to FIG. 17, is directly printed (S150, S124, S126).

In other words, according to this embodiment, if the memory card which contains the image data representing the background image as the first image data is mounted in the camera body, the mode is automatically set to the composite image direct printing mode so that the composite image of the captured image and the background image can be printed.

FIG. 19 is a flow chart showing a modification example of the process which was described with reference to FIG. 17.

In FIG. 19, S152 is added to the process of FIG. 17. It is determined at S152 whether the mode is the direct printing mode or not. If the mode is the direct printing mode and the first image data in the memory card represents the background image data (S156), the electronic camera 1 starts capturing the first image data (S120).

FIG. 20 is a flow chart showing the normal image-capturing process, the process of directly printing the captured image, and the process of directly printing the composite image which is composed from the captured image and the background image, corresponding to the process described with reference to FIG. 19.

As shown in FIG. 20, when the release button 9 is pressed (S140), it is determined whether the mode is the direct printing mode or not (S152). If the mode is decided as not being the direct printing mode, the normal image-capturing is performed (S144). If the mode is decided as being the direct printing mode, it is further determined whether the first image data in the memory card which is mounted in the electronic camera body 1 represents the background image or not (S158).

If the first image data is decided as not representing the background image at S158, the captured subject image is directly printed (S148). If the first image data is decided as representing the background image, the composite image of the captured subject image and the previously-captured background image, which is captured in the process described with reference to FIG. 19, is directly printed (S150, S124, S126).

In other words, according to this embodiment, if the memory card which contains the image data representing the background image as the first image data is mounted in the electronic camera 1, the mode is automatically set to the composite image direct printing mode so that the composite image of the captured image and the background image is printed.

In these embodiments, the image data representing the composite image is output to the printer; however, it may be output to the memory card, the personal computer, and the like. When the image data is record into the memory card which provides the background image, the data relating to the background image is protected, and thereby, it is possible to prevent the data from being erased by mistake and overwritten with the image data representing the captured image and the composite image. Furthermore, the image data representing the captured image and the composite image may be recorded in another memory card which is inserted into the card slot electronic camera.

Moreover, in these embodiments, the memory card is used as the background image provider, which provides the image data representing the background image; however, it is also possible to use another recording medium such as a memory built in the electronic camera and a floppy disk which is attached to and detached from the electronic camera. Further, it is also possible to use external equipment such as a personal computer which connects to the electronic camera via the interface.

Furthermore, in these embodiments, the accessory unit (image composing unit) is detachably attached on the camera body; however, it may be incorporated into the camera.

As set forth hereinabove, according to the electronic camera accessory of the present invention, the terminal for connecting to the printer is provided on the accessory which is detachably attached on the electronic camera via the interface, and the printer which is directly connected to the accessory via the terminal is controlled by the two-way communication between the electronic camera and the printer through the accessory. Thus, the personal computer is not required for printing, and the printing can easily be performed. Moreover, it is possible to reduce the time for sending and receiving the image data, and print the image in a short period of time.

Since this direct printing function is a special one, the accessory provided with the function is additionally attached to the electronic camera as the need arises. Hence, the camera body can be compact and inexpensive.

The electronic camera accessory is provided with a plurality of the color correction LUT for various types of printers which can connect to the terminal. The type of the connected printer is automatically recognized in accordance with the signal which is output from the printer in the two-way communication, so that the color correction LUT suitable for each printer type can be selected. For this reason, the color of the image to be printed can be automatically adjusted according to the characteristics of the connected printer.

Moreover, the image data is captured in response to the depression of the release button, and the captured image data is transferred to the accessory via the interface, so that the captured image can be printed at the same time as the image-capturing. The image data of the still image, which is captured in response to the manipulation of the release button, is transferred to the accessory without being compressed, so that the processing time can be further reduced.

Furthermore, according to the electronic camera accessory of the present invention, the captured image data is sequentially stored in the uncompressed state into the storage in the accessory during the sequential image-capturing. After the sequential image-capturing is completed, the image data is read on a frame-by-frame basis in an order in which the image data is stored, and the image data is transferred to the camera. The predetermined signal processing such as compression is performed for the image data, and then the image data is recorded in the memory. For this reason, the sequential image-capturing is not restricted by the time required for recording.

As stated above, the special function of the sequential image-capturing is provided in the electronic camera accessory, so that the camera body can be compact and inexpensive.

Moreover, according to the present invention, if the sequential image-capturing restarts before the whole image data is read from the storage, the reading of the image data stored in the storage is suspended, and thus the storing of the sequentially-captured image data can be immediately resumed within the available storage capacity of the storage.

Further, the image data which is sequentially captured during the sequential image-capturing is handled as the sequential data in the memory space of the storage, and the image data is written in the linear format in the memory space. Thus, it is possible to use the memory area more efficiently, and perform the sequential image-capturing with a relatively small capacity of memory than ever.

Furthermore, the electronic camera with the image-composing function according to the present invention has the normal image-capturing function and the image-composing function which composes an image from the captured or reproduced image and the previously-captured background image. The normal and composite images can be directly printed through the two-way communication between the electronic camera and the printer which directly connects to the camera. For this reason, the personal computer is not required for printing, and the printing can easily be performed.

Since these direct printing function and image-composing function are special ones, an image composing unit provided with the functions is additionally attached to the electronic camera as the need arises. Hence, the camera body can be compact and inexpensive.

Further, according to the present invention, the normal image-capturing function and the image-composing function are automatically switched by utilizing the identifier which is provided on the recording medium such as the memory card mounted in the electronic camera, or the identification information recorded in the recording medium. For this reason, there is no necessity to switch the modes and set the switches. Moreover, the background image is provided by the recording medium such as the memory card which is detachably mounted in the electronic camera. Thus, it is possible for the user to easily and freely select/change the background images and to record the composite image in the same recording medium as the recording medium to which the background image is input, or another recording medium.

Furthermore, according to the present invention, the information about the position and size of the pasting area, which is required for composition, is provided in advance, and the composition is performed in accordance with the information. Thereby, the user freely captures a picture and satisfactorily composes an image from the captured image and the background image without paying any attention to the background image. In other words, it is possible to prevent the captured main subject from being obscured by the background image.

Moreover, the recording medium of the present invention is able to provide the image data representing the background image to the equipment such as the electronic camera and the personal computer which can compose an image. The data is protected from overwritten so as to prevent the data from being erased by mistake. Further, the mask pattern indicating the pasting area used for composition is run-length compressed to be recorded with the image data representing the background image. For this reason, the background image including the mask pattern is recorded in the same size as the normal image, so that a number of background images can be recorded in the limited recording capacity or a space in the memory can be increased.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic camera accessory which detachably connects, via an interface, to an electronic camera, said electronic camera accessory comprising:
   a terminal which enables said accessory to connect to a printer; and
   a controller which performs two-way communication with the printer and transfers image data via said interface to the printer in a data format suitable for the printer, the controller further including:
     a memory for storing image data and a buffer for temporarily retaining input image data, so that the controller can refresh the memory, thereby enabling space in the memory to be effectively used in a linear format.

2. The electronic camera accessory as defined in claim 1, wherein said terminal is a SCSI terminal.

3. The electronic camera accessory as defined in claim 1, further including
   a plurality of color correction lookup tables which are suitable for a plurality of printers able to connect to said terminal; wherein the type of printer connected to said terminal is determined in accordance with a signal output from the printer, and wherein the color of the image to be printed is adjusted by means of a color correction lookup table suitable for the printer.

4. The electronic camera accessory as defined in claim 1, wherein the controller transfers image data, captured in image-capturing action started by pressing a release button of said electronic camera, to said printer in response to the image-capturing action.

5. The electronic camera accessory as defined in claim 4, wherein the image data captured by the operation of said release button is transferred in an uncompressed state to the electronic camera accessory.

6. An electronic camera accessory detachably connected to an electronic camera having a signal processor and a data compressor, the electronic camera accessory comprising:
   memory for storing uncompressed image data transferred from the signal processor to the electronic camera accessory during sequential image-capturing of image data in a sequential image-capturing mode of the electronic camera; and
   a controller which sequentially stores, in said memory, image data of a plurality of frames sequentially captured during the sequential image-capturing mode, which reads, after the sequential image-capturing is completed, the image data of each frame from said memory in and order in which the frames are stored, and which transfers the read image data to the data compressor.

7. The electronic camera accessory as defined in claim 6, wherein the controller suspends reading of the image data stored in said memory and resumes storing the sequentially-captured image data, if a new sequential image-capturing is started before reading of the image data is completed.

8. The electronic camera accessory as defined in claim 6, wherein said controller is composed of a memory controller and a FIFO processing part.

9. The electronic camera accessory as defined in claims 6 or 8, wherein said controller handles the uncompressed image data as sequential data in a memory space of said memory and linearly writes the image data of the plurality of frames.

10. An image composition system for use in an electronic camera comprising:
    an image capturer which picks up a subject image and obtains image data representing the picked-up image;
    a background image provider which provides image data representing a background image;
    a combining processor which combines the image data representing the background image and the picked-up image;
    an output unit which outputs a composite image representing the image data combined in the combining processor; and
    a controller which performs two-way communication with the output unit and which transfers the combined image data in a format suitable to the output unit, the controller further including:
      memory means for storing the combined image data; and
      buffer means for temporarily retaining the combined image data, so that the controller can refresh the memory means, thereby enabling space in the memory means to be effectively used in a linear format.

11. An electronic camera with an image-composing function, comprising:
    an electronic camera which picks up a subject image shown on a finder and obtains image data representing the picked-up image;
    a background image provider which provides image data representing a background image; and
    an image composing unit detachably connected to said electronic camera, the image composing unit further comprising:
      a terminal connected to said electronic camera, a terminal capable of connecting to a printer, a combining processor which combines the image data representing the background image and the image data representing the picked-up image, and a controller which performs two-way communication with the printer and transfers the combined image data to the printer in a format suitable for the printer, the controller further including:
        memory means for storing the combined image data; and
        buffer means for temporarily retaining the combined image data, so that the controller can refresh the memory means, thereby enabling space in the memory means to be effectively used in a linear format.

12. The electronic camera with the image-composing function as defined in claim 11, further comprising an image reproducer which reads image data representing a background image from said background image provider and displays the background image on a display in a reproducing mode, so that a desired background image can be selected.

13. The electronic camera with the image-composing function as defined in claim 11, wherein said combining processor and said controller act in response to image-picking action started by pressing a release button, after said combining processor reads the image data representing a desired background image from said background image provider.

14. The electronic camera with the image-composing function as defined in claim 11, wherein said background image provider is a recording medium detachably connected to said electronic camera.

15. An electronic camera with an image-composing function, comprising:

an electronic camera comprising an image capturer which picks up a subject image shown on a finder and obtains image data representing the picked-up image, a recording medium on which said image data is recorded, and an image reproducer which reads image data from said recording medium and displays a reproduced image on a display;

a background image provider which provides image data representing a background image; and an image composing unit detachably connected to said electronic camera, said image composing unit further comprising a terminal connected to said electronic camera, a terminal capable of connecting to a printer, a combining processor which combines the image data representing the background image and the image data representing the reproduced image, and a controller which performs two-way communication with the printer and transfers the combined image data to the printer in a format suitable for the printer, the controller further including:

memory means for storing the combined image data; and buffer means for temporarily retaining the combined image data, so that the controller can refresh the memory means, thereby enabling space in the memory means to be effectively used in a linear format.

16. The electronic camera with the image-composing function as defined in claim 15, wherein said combining processor and said controller act in response to manipulation of a key which gives a printing instruction, after said combining processor reads the image data representing a desired background image from said background image provider.

17. The electronic camera with the image-composing function as defined in claim 15, wherein said background image provider is a recording medium detachably connected to said electronic camera.

18. The electronic camera of claim 17, wherein information about the origin and size of a pasting area in the background image is recorded with background image data in the recording medium, and wherein the combining processor controls position and expansion/compression of the picked-up or reproduced image in accordance with the origin and size information to paste the picked-up or reproduced image on the background image.

19. The electronic camera of claim 17, wherein a mask pattern indicating a pasting area in the background image is recorded in run-length compression format with the background image data in the recording medium, and wherein the combining processor pastes the picked-up or reproduced image on the background image in accordance with said mask pattern.

20. The electronic camera of claim 17, wherein the combining processor performs image processing so that the resolution of the background image is substantially equal to that of the picked-up or reproduced image.

21. The electronic camera with the image-composing function as defined in claim 11 or 15, wherein said background image provider is at least one of a built in memory and external equipment connected to said electronic camera.

22. The electronic camera with the image-composing function as defined in claim 11 or 15, wherein said terminal capable of connecting to the printer is a SCSI terminal.

23. An electronic camera with an image-composing function, comprising:

an image capturer which picks up a subject image shown on a finder and obtains image data representing the picked-up image;

a recording medium detachably connected to a camera body;

a detector which detects whether image data representing a background image is recorded in said recording medium;

a combining processor which combines the image data representing the picked-up image and the image data representing the background image, if the detector detects that the image data representing the background image is recorded in said recording medium; and an output unit which outputs the combined image data representing a composite image, if the detector detects that the image data representing the background image is recorded in said recording medium, and outputs the image data representing the picked-up image, if the detector does not detect that the image data representing the background image is recorded in said recording medium.

24. The electronic camera with the image-composing function as defined in claim 23, wherein the detector detects whether the image data representing the background image is recorded or not in said recording medium, in accordance with at least one of an identifier provided on said recording medium and identification information recorded in a header of each frame recorded in said recording medium.

25. The electronic camera with the image-composing function as defined in claim 23, wherein said output unit outputs the image data to at least one of a printer and a recording medium.

26. An electronic camera with an image-composing function, comprising:

an image capturer which picks up a subject image shown on a finder and obtains image data representing the picked-up image;

a recording medium which is detachably connected to a camera body, wherein image data representing a background image is recorded in at least a part of said recording medium;

a combining processor which combines the image data representing the picked-up image and the image data representing the background image, thereby forming combined image data; and a recorder which records the combined image data wherein the combined image data is recorded in an area of the recording medium other than the part of the recording medium where the image data representing the background image is being recorded.

27. The electronic camera with the image-composing function as defined in claim 14, 17, 23, or 26, wherein information about the origin and size of a pasting area in the background image is recorded with the image data representing the background image in said recording medium, and wherein the combining processor controls position and expansion/compression of the picked-up image in accordance with the origin and size information, to thereby paste the picked-up image on the background image.

28. The electronic camera with the image-composing function as defined in claim 14, 17, 23 or 26, wherein a mask pattern indicating a pasting area in the background image is recorded in a run-length compression format with the image data representing the background image in said recording medium, and wherein the combining processor pastes the picked-up image on the background image in accordance with the mask pattern.

29. The electronic camera with the image-composing function as defined in claim 14, 17, 23 or 26, wherein said combining processor performs image processing so that the resolution of the background image is substantially equal to that of the picked-up image.

30. The electronic camera with the image-composing function as defined in claim 14, 17, 23 or 26, wherein said combining processor receives information about at least one of an image-pickup date and image-pick-up conditions, and combines the information with the combined image data of the composite image so that the information can be printed on the composite image.

31. An electronic camera according to claim 30, wherein the combined image data is recorded on another recording medium mounted on said camera body.

32. An accessory for an electronic camera, comprising:
   an interface for connecting the accessory to the camera; and
   a controller for transferring image data input from the camera, via the interface, to a printer, the controller further including:
      memory for storing image data input from the camera through the interface; and
      a buffer for temporarily retaining input image data, so that the controller can refresh the memory, thereby enabling space in the memory to be effectively used in a linear format.

33. The accessory of claim 32, further comprising a terminal which enables the accessory to be connected to the printer.

34. The accessory of claim 33, wherein the terminal is a SCSI terminal.

35. The accessory of claim 32, wherein the controller transfers image data to the printer in response to an image-capturing action.

36. The accessory of claim 35, wherein the image-capturing action is the pressing of a button on the camera.

37. The accessory of claim 32, wherein the buffer is a FIFO processing part.

38. A detachable camera accessory for use in an electronic camera, comprising:
   a memory for storing sequentially-captured uncompressed image data of a plurality of frames transferred from a signal processor of the electronic camera when the camera is in a sequential image-capturing mode; and
   a controller for controlling the memory so that it sequentially stores the uncompressed image data, for reading the uncompressed image data in the order in which frames are stored in said memory, and for transferring the read uncompressed image data back to the camera to be compressed in a data compressor,
   wherein the controller further includes a buffer for temporarily retaining the uncompressed image data, so that the controller can refresh the memory, thereby enabling space in the memory to be effectively used in a linear format.

39. The detachable camera accessory of claim 38, wherein the controller is a memory controller and the buffer is a FIFO processing part.

40. The detachable camera accessory of claim 38, wherein the controller linearly writes the uncompressed image data of the plurality of frames in a memory space of said memory.

41. An electronic camera, comprising:
   image capturing means for obtaining image data from a picked-up subject image;
   background image provider means for providing background image data;
   image composing means detachably connected to said electronic camera for combining a plurality of image data, the image composing means including:
      connector means for connecting the image composing means to a printer,
      combining means for combining image data from the picked-up subject image with the background image data to thereby obtain combined image data, and
      controller means for performing two-way communication with the printer and for transferring the combined image data to the printer in a suitable format, the controller further including:
         memory means for storing the combined image data; and
         buffer means for temporarily retaining the combined image data, so that the controller can refresh the memory means, thereby enabling space in the memory means to be effectively used in a linear format.

42. The electronic camera of claim 41, wherein the connector means is an SCSI terminal.

43. The electronic camera of claim 41, wherein the buffer means is a FIFO processing part.

44. The electronic camera of claim 41, wherein the background image provider means is a recording medium detachably connected to the electronic camera.

45. The electronic camera of claim 44, wherein information about the origin and size of a pasting area in the background image is recorded with background image data in the recording medium, and wherein the combining means controls position and expansion/compression of the picked-up subject image in accordance with the origin and size information to paste the picked-up subject image on the background image.

46. The electronic camera of claim 44, wherein a mask pattern indicating a pasting area in the background image is recorded in run-length compression format with background image data in the recording medium, and wherein the combining means pastes the picked-up subject image on the background image in accordance with said mask pattern.

47. The electronic camera of claim 44, wherein the combining means performs image processing so that the resolution of the background image is substantially equal to that of the picked-up subject image.

48. The electronic camera of claim 44, wherein the combining means receives information about at least one of an image-pickup data and image-pickup conditions, and combines this information with the combined image data of the composite image to print this information on the composite image.

49. An accessory for use with an electronic camera having a separate recording medium attached thereto, comprising:
   an interface for receiving picked-up image data which is image-captured by the electronic camera;
   a terminal for connecting the accessory to a printer;
   a combining processor for combining picked-up image data with background image data recorded on the recording medium, thereby forming combined image data; and
   a controller for performing two-way communication with the printer and for transferring the combined image data to the printer in a suitable format, the controller further including:
      a memory for storing the combined image data; and
      a buffer for temporarily retaining the combined image data, so that the controller can refresh the memory, thereby enabling space in the memory to be effectively used in a linear format.

50. The accessory according to claim 49, wherein the background image data is pre-recorded and protected on a part of the recording medium.

51. The accessory according to claim 49, wherein information about the origin and size of a pasting area in the background image is recorded with the background image data.

52. The accessory according to claim 49, wherein a mask pattern indicating a pasting area in the background image, and which is used by the combining processor, is recorded in run-length compression format with the background image data in the recording medium.

53. An accessory for an electronic camera, comprising:

an interface for detachably connecting the accessory to the camera; and a controller for transferring image data input from the camera, via the interface, to a printer in response to an image-capturing action, wherein the image data is input to the accessory from the camera inan uncompressed state.

54. The accessory of claim 53, wherein the image-capturing action is the pressing of a button on the camera.

55. The accessory of claim 53, further comprising a terminal which enables the accessory to be connected to the printer.

56. The accessory of claim 55, wherein the terminal is a SCSI terminal.

* * * * *